(12) United States Patent
Poilbout

(10) Patent No.: US 8,190,327 B2
(45) Date of Patent: May 29, 2012

(54) SUSPENSION CONTROL DEVICE, VEHICLE COMPRISING SAID DEVICE, PRODUCTION METHOD THEREOF AND ASSOCIATED PROGRAM

(75) Inventor: Francois Poilbout, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 943 days.

(21) Appl. No.: 12/067,763

(22) PCT Filed: Sep. 13, 2006

(86) PCT No.: PCT/FR2006/050886
§ 371 (c)(1),
(2), (4) Date: Aug. 29, 2008

(87) PCT Pub. No.: WO2007/034102
PCT Pub. Date: Mar. 29, 2007

(65) Prior Publication Data
US 2008/0319609 A1    Dec. 25, 2008

(30) Foreign Application Priority Data
Sep. 22, 2005  (FR) ..................................... 05 09702

(51) Int. Cl.
*B60G 17/016*    (2006.01)
(52) U.S. Cl. ...... 701/37; 701/38; 280/5.502; 280/5.506; 280/5.507; 280/5.508
(58) Field of Classification Search .................... 701/37, 701/38; 280/5.5–5.509
See application file for complete search history.

(56) References Cited

U.S. PATENT DOCUMENTS

| | | | | |
|---|---|---|---|---|
| 5,142,475 A | * | 8/1992 | Matsunaga et al. | 701/37 |
| 5,251,728 A | * | 10/1993 | Mund et al. | 188/266.6 |
| 5,445,405 A | | 8/1995 | Onozawa et al. | |
| 5,488,556 A | | 1/1996 | Sasaki et al. | |
| 5,570,287 A | * | 10/1996 | Campbell et al. | 701/37 |
| 5,696,677 A | * | 12/1997 | Leaphart et al. | 701/37 |
| 5,732,370 A | * | 3/1998 | Boyle et al. | 701/37 |
| 5,742,918 A | * | 4/1998 | Ashrafi et al. | 701/70 |

(Continued)

FOREIGN PATENT DOCUMENTS

EP    0616912 A    9/1994

(Continued)

OTHER PUBLICATIONS

International Search Report mailed May 2, 2007 in PCT/FR2006/050886.

*Primary Examiner* — Paul N Dickson
*Assistant Examiner* — James English
(74) *Attorney, Agent, or Firm* — Nicolas E. Seckel

(57) ABSTRACT

The invention relates to a device for controlling the suspension of the body shell of a motor vehicle. The inventive device comprises a calculator (CSS) which can calculate a control value (ER) for an actuator (M) of a shock absorber (AM) of the suspension (S) as a function of at least one modal body shell speed calculated from a modal body shell acceleration. The invention is characterized by a sensor (CAP-DEB) for sensing wheel (A,B, C, D) travel in relation to the body shell, which is connected to a first means (CAL) for calculating the modal body shell acceleration from the travel measurement (DEB) provided by the sensor (CAP-DEB).

18 Claims, 14 Drawing Sheets

U.S. PATENT DOCUMENTS

Figure 1:
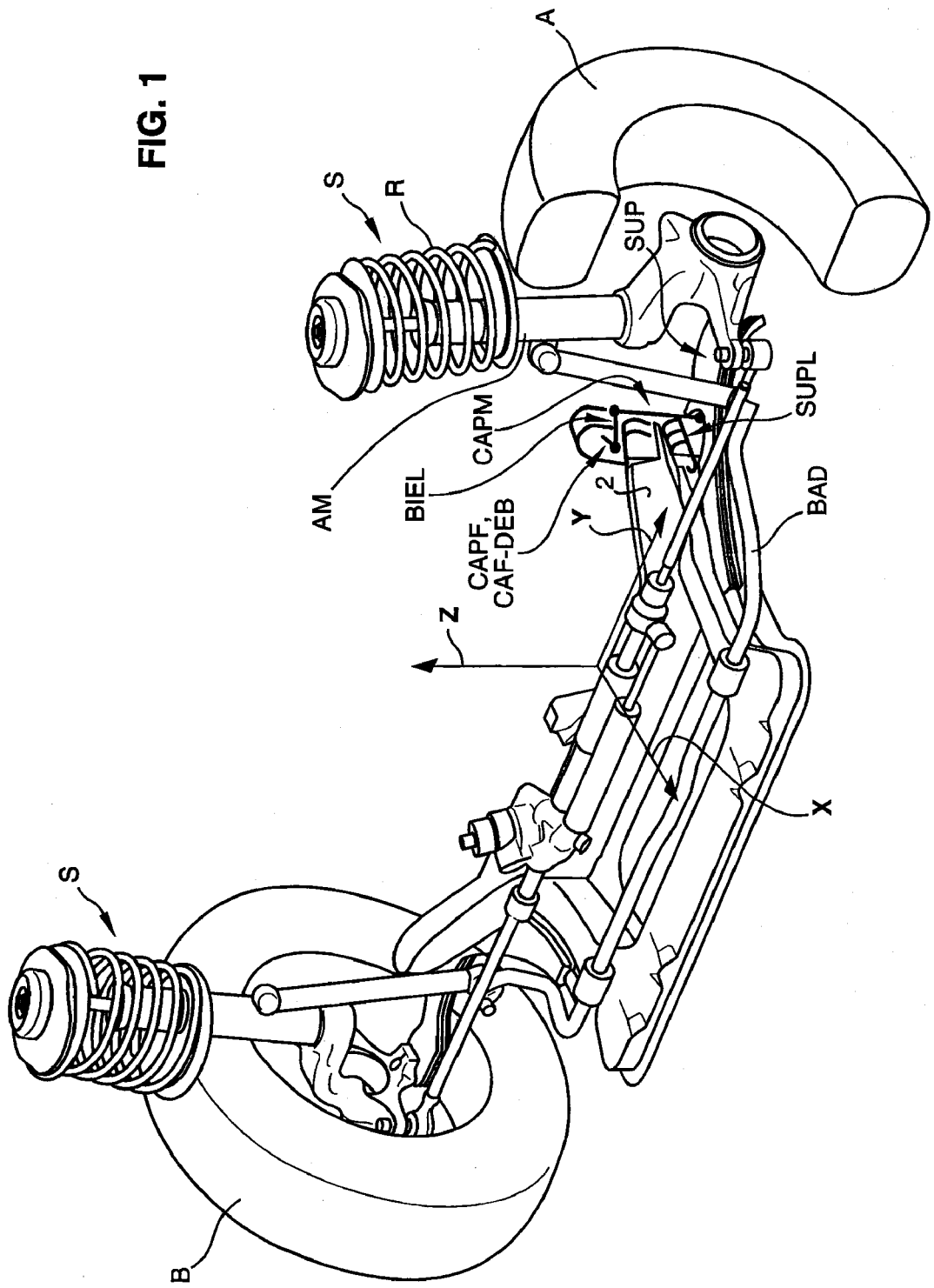

| | | | |
|---|---|---|---|
| 5,884,921 A | | 3/1999 | Katsuda et al. |
| 6,026,338 A | * | 2/2000 | Borschert et al. ............... 701/37 |
| 6,055,471 A | * | 4/2000 | Ohsaku et al. ................. 701/37 |
| 6,314,353 B1 | * | 11/2001 | Ohsaku et al. ................. 701/37 |
| 6,321,887 B1 | | 11/2001 | Kurusu et al. |
| 6,366,841 B1 | * | 4/2002 | Ohsaku ......................... 701/37 |
| 2003/0055549 A1 | * | 3/2003 | Barta et al. ..................... 701/70 |
| 2005/0206100 A1 | * | 9/2005 | Ohta et al. ................. 280/5.511 |

FOREIGN PATENT DOCUMENTS

| | | |
|---|---|---|
| WO | WO 03/069183 A | 8/2003 |

* cited by examiner

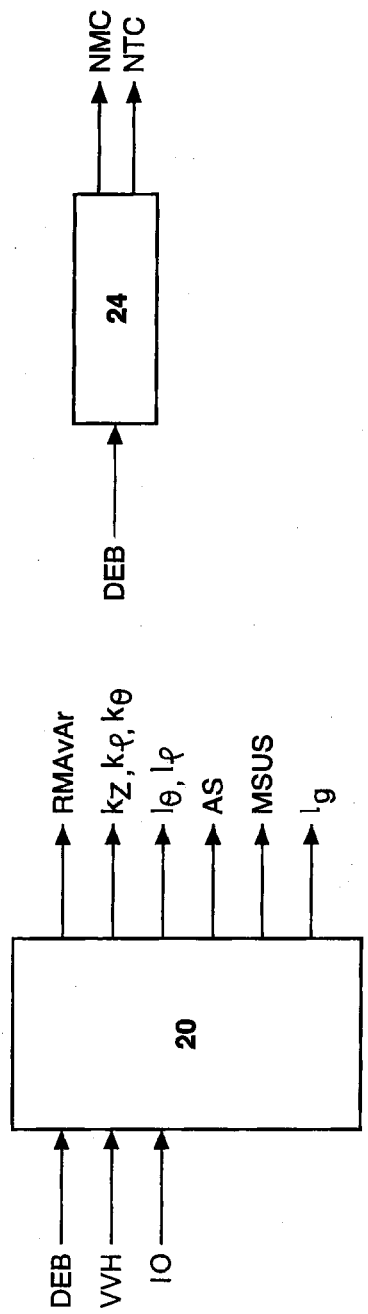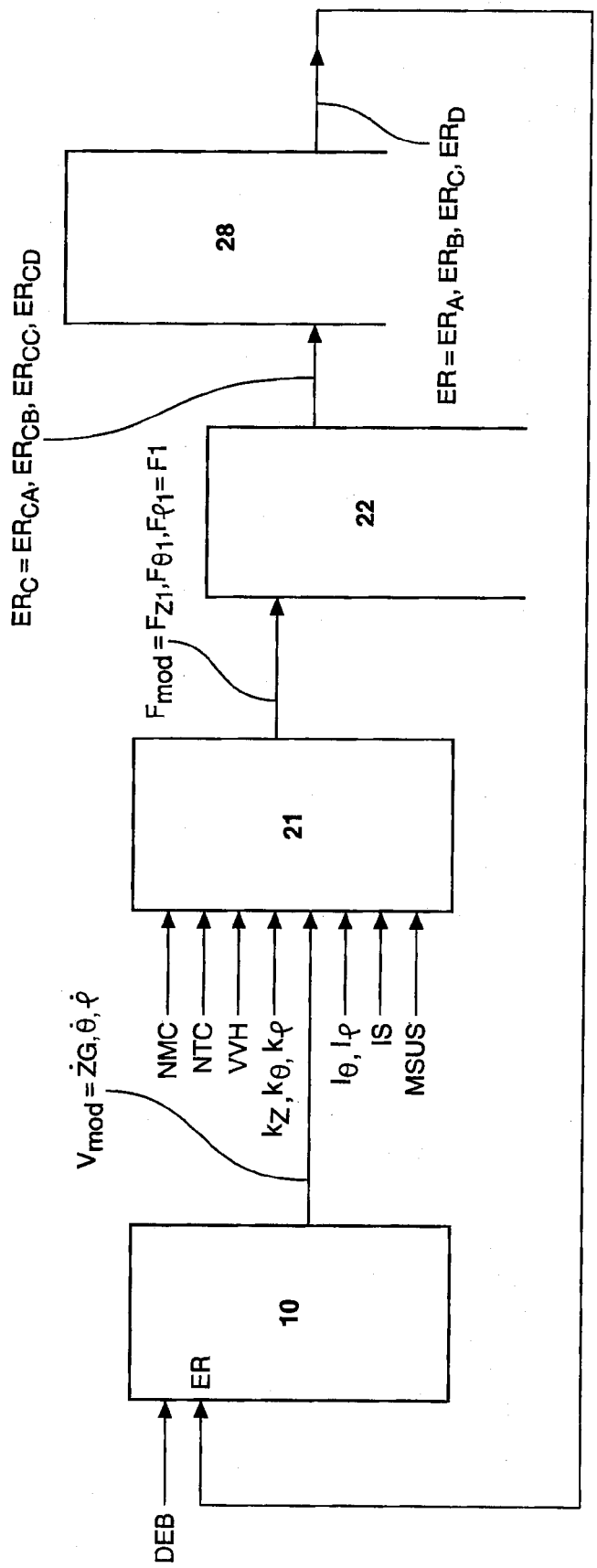
FIG. 6

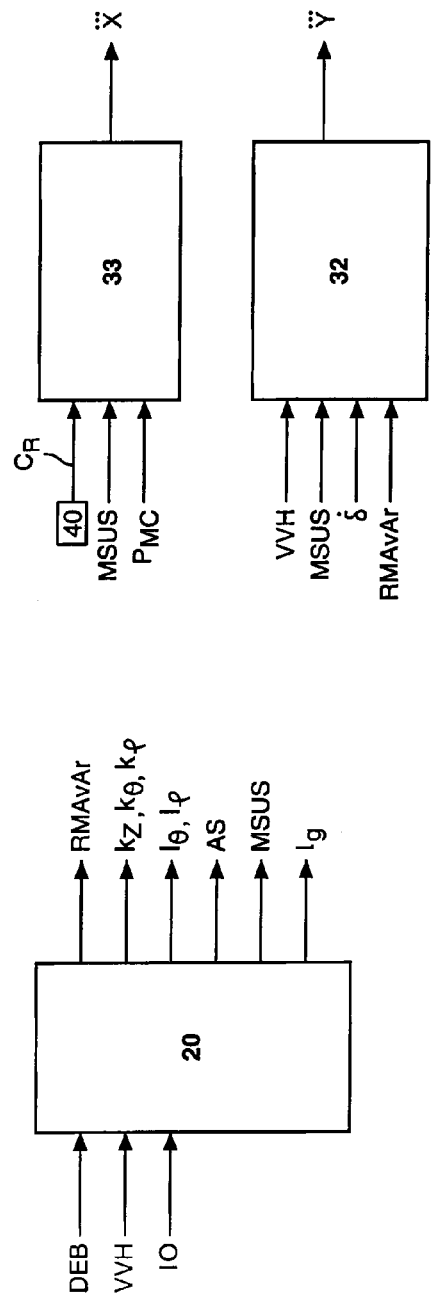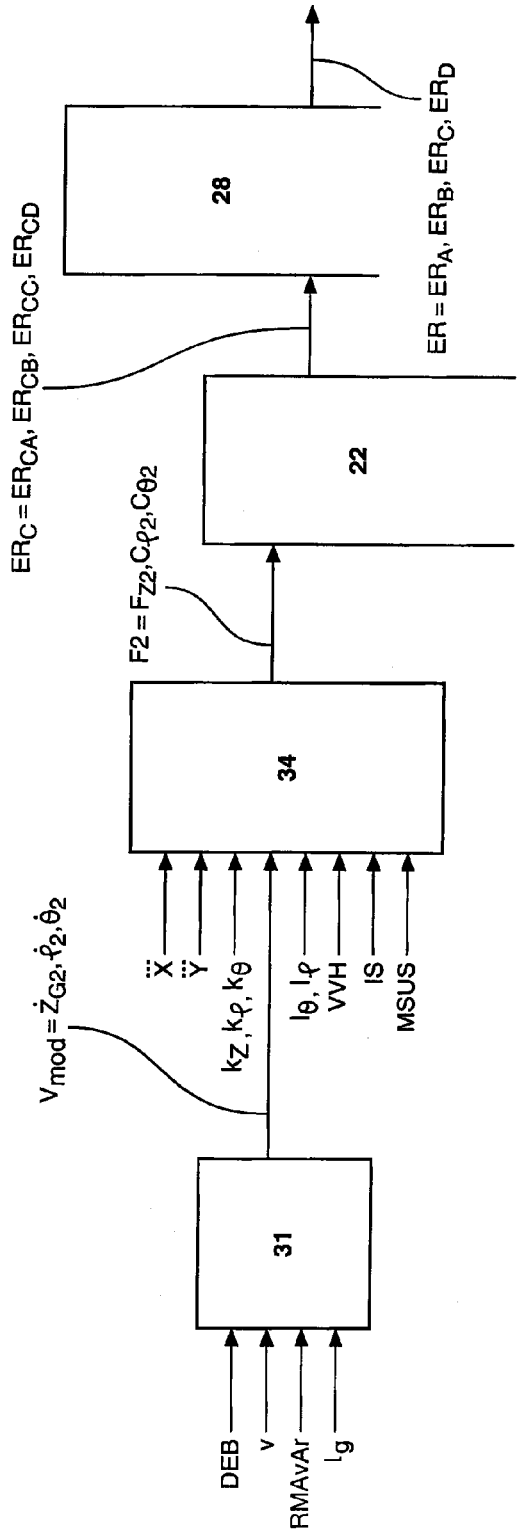
FIG. 10

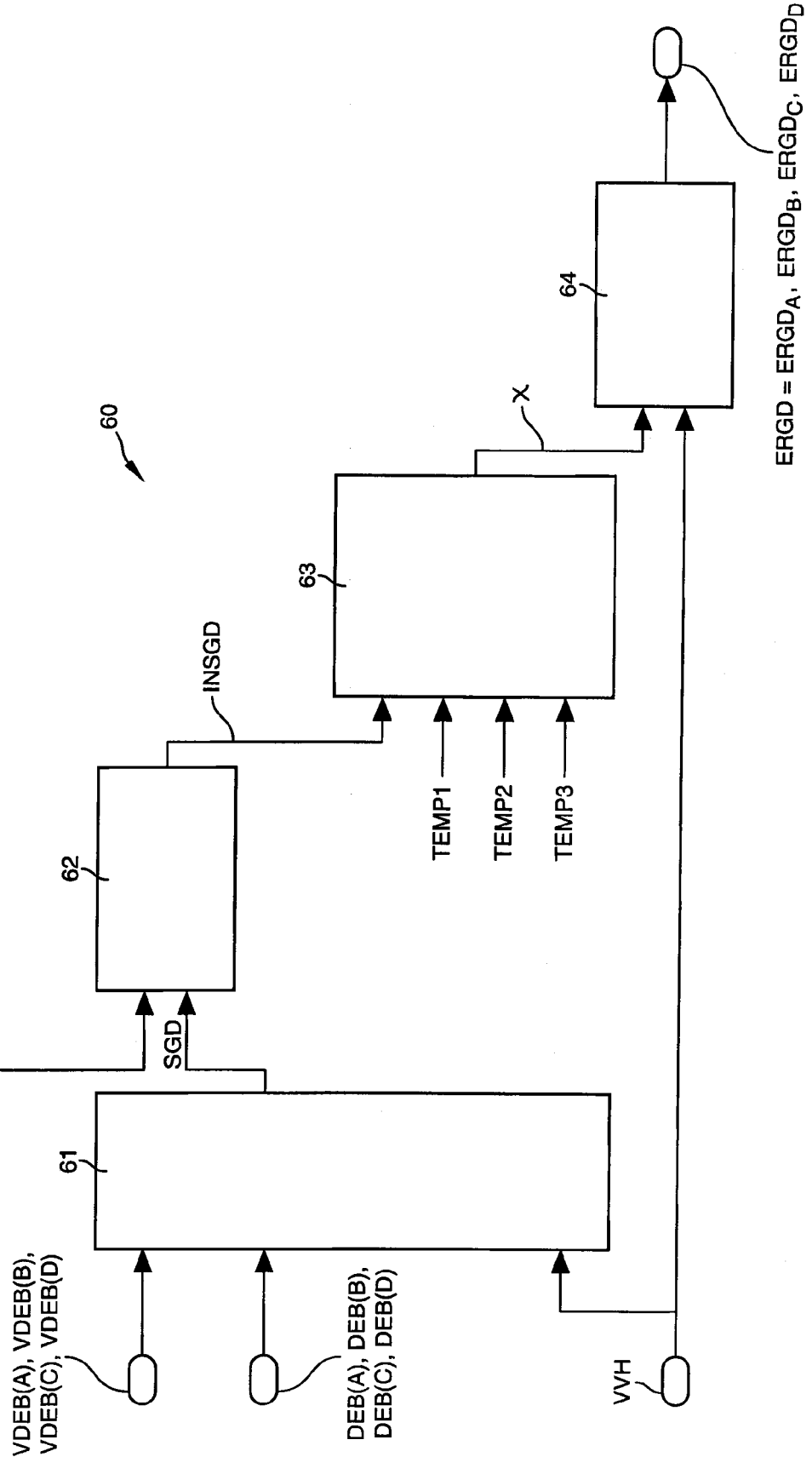

SUSPENSION CONTROL DEVICE, VEHICLE COMPRISING SAID DEVICE, PRODUCTION METHOD THEREOF AND ASSOCIATED PROGRAM

The invention relates to a suspension control device for a motor vehicle.

A field of application of the invention relates to motor vehicles having a spring suspension, a hydropneumatic suspension or another type of suspension.

These suspensions have a damper on each wheel that uses a law of variable damping that can be set by an actuator controlled by a computer on board the vehicle.

The computer receives input measurements provided by sensors, and calculates the command magnitude or magnitudes for the damper actuators therefrom.

The computer particularly takes into account the accelerations to which the vehicle body is subjected during travel, such as heave modal acceleration in the vertical direction, roll modal acceleration about a longitudinal axis, and pitch modal acceleration about a transverse axis.

The computer uses integration to calculate the corresponding modal velocities of the body.

Devices are known in which the computer implements a control process to make the vertical modal velocity of heave, the angular modal velocity of roll and the angular modal velocity of pitch tend toward zero; this logic is commonly called "Skyhook", and makes it possible to improve the comfort of the people in the car.

Such devices are known which use three accelerometers to measure the three modal accelerations.

These accelerometers measure each an acceleration along a determined direction and they must be implanted in a very precise way in the vehicle, in order to provide a reliable measure of the modal accelerations and to avoid distorting the instructions sent by the computer to the actuators.

Additionally, each accelerometer installed on the vehicle is relatively expensive.

An objective of the invention is to obtain a suspension control device that remedies the drawbacks of the state of the art and that can do without accelerometers for calculating at least one body modal speed in a reliable way.

To this effect, a first object of the invention is a suspension control device with variable damping for a motor vehicle body on its wheels, having a computer adapted to calculate a control magnitude of an actuator of at least one damper with variable damping of the suspension as a function of at least one body modal speed calculated from at least one body modal acceleration determined on the vehicle, characterized in that it further comprises at least one sensor of the displacement of a wheel with respect to the vehicle body, connected to a first means for calculating the body modal acceleration from the displacement measurement provided by the displacement sensor.

Thus, the invention makes it possible to use the displacement sensors present on the wheels to estimate the body modal accelerations in real time. The invention, not only avoids the expense of three accelerometers, but also, eliminates the bulk caused by these three accelerometers mounted in the body of the vehicle in predetermined locations thereof.

According to other characteristics of the invention, the first means for calculating the body modal acceleration comprises an estimator of at least one force exerted by the suspension of said wheel on the body as a function of at least the displacement measurement provided by the displacement sensor, and a second means for calculating the body modal acceleration as a function of at least the suspension force provided by said suspension force estimator;

the suspension force estimator comprises:

a derivator module calculating a displacement speed from a displacement measurement provided by the displacement sensor, an estimator of a damping force of the damper as a function of the displacement speed provided by the derivator module and the memorized current damping law of the damper, an estimator of a dry friction force as a function of the displacement speed, an estimator of a flexure force of suspension springs and stops as a function of the displacement value and a determined static attitude of the body;

the estimator of the dry friction force is a hyperbolic tangential (tan h) or circular tangent (tg) function of the displacement speed divided by a fixed value, this function being multiplied by a prescribed multiplying factor;

the estimator of the flexure force of suspension springs and stops comprises:

a module for calculating the static attitude of the vehicle as a function of the displacement value, an adder for calculating a summed value of the displacement value and the static attitude, a module for calculating an absolute flexure force of suspension springs and stops as a function of said summed value, a module for calculating a static flexure force on said wheel as a function of the static attitude, a subtractor providing said flexure force of suspension springs and stops by subtracting the static flexure force from the absolute flexure force of suspension springs and stops;

a displacement sensor is provided for each of the two front wheels and the two rear wheels, and the module for calculating the static attitude has a means for calculating the front static attitude and the rear static attitude of the vehicle, as being the mean displacement of the front wheel displacements and the rear wheel displacements, respectively, filtrated by a low-pass filter, a front attitude offset constant and a rear attitude offset constant, respectively, being added to this filtered mean displacement;

the first calculation means further comprises an estimator of a roll torque and/or an estimator of a pitch torque;

the first calculation means has:

a means for calculating a transverse acceleration reset value RECT, a sensor of the vehicle body transverse acceleration ACCT;

the roll torque estimator calculating said roll torque $c_\theta$ using the formula:

$$c_\theta = (ACCT - RECT) \cdot (MTOT) \cdot d(G, CR)$$

where MTOT is the vehicle mass, and $d(G, CR)$ is the predetermined distance between the center of gravity of the body and its roll center, the first calculation means (CAL) has:

a means for calculating a longitudinal acceleration reset value RECL, a sensor of the longitudinal acceleration ACCL of the vehicle body, the estimator of the pitch torque calculating said pitch torque $c_\phi$ using the formula:

$$c_\phi = (ACCL - RECL) \cdot (MTOT) \cdot hG + c_{\phi B},$$

where MTOT is the vehicle mass, hG is the predetermined height between the center of gravity of the body and its pitch center, and $C_{\phi B}$ is the component of the pitch torque attributable to the Brouilhet effect;

the component $c_{\phi B}$ of the pitch torque attributable to the Brouilhet effect is calculated as a function of a braking information unit provided by a determination module as a function of a master cylinder pressure value provided by a master cylinder pressure sensor;

the device comprises a first filter that eliminates at least the low frequencies of the body modal acceleration provided by the first calculation means and a third means for calculating the body modal speed from the filtered body modal acceleration provided by the first filter;

the low cutoff frequency of the first filter is greater than or equal to 0.1 Hz;

the first means for calculating the body modal acceleration comprises a second filter that eliminates at least the low frequencies from the displacement measurement provided by the displacement sensor;

the low cutoff frequency of the second filter is greater than or equal to 0.2 Hz;

the control magnitude is a damping law determined from a plurality of different damping laws that impose the damper force as a function of its displacement speed.

A second object of the invention is a motor vehicle having a body, wheels, a suspension of the body on the wheels, and a suspension control device as described above.

A third object of the invention is a production method for a motor vehicle, the motor vehicle being equipped with wheels, a body, a suspension having at least one damper with variable damping of the body on the wheels, and a suspension control device, the control device having at least one computer adapted to calculate a control magnitude of an actuator of said at least one suspension damper, the production method having a step in which the computer is mounted on the vehicle, characterized in that the production method has at least one computer programming step using at least one program having program instructions that employ the calculating means of the suspension control device as described above.

A fourth object of the invention is a computer program for controlling a computer, having program instructions for calculating the body modal acceleration from the displacement measurement provided by the wheel displacement sensor, for calculating the body modal velocity as a function of at least this body modal acceleration, and for calculating the control magnitude of the actuator as a function of this body modal speed, when it is employed in a suspension control device as described above.

Figure 2:
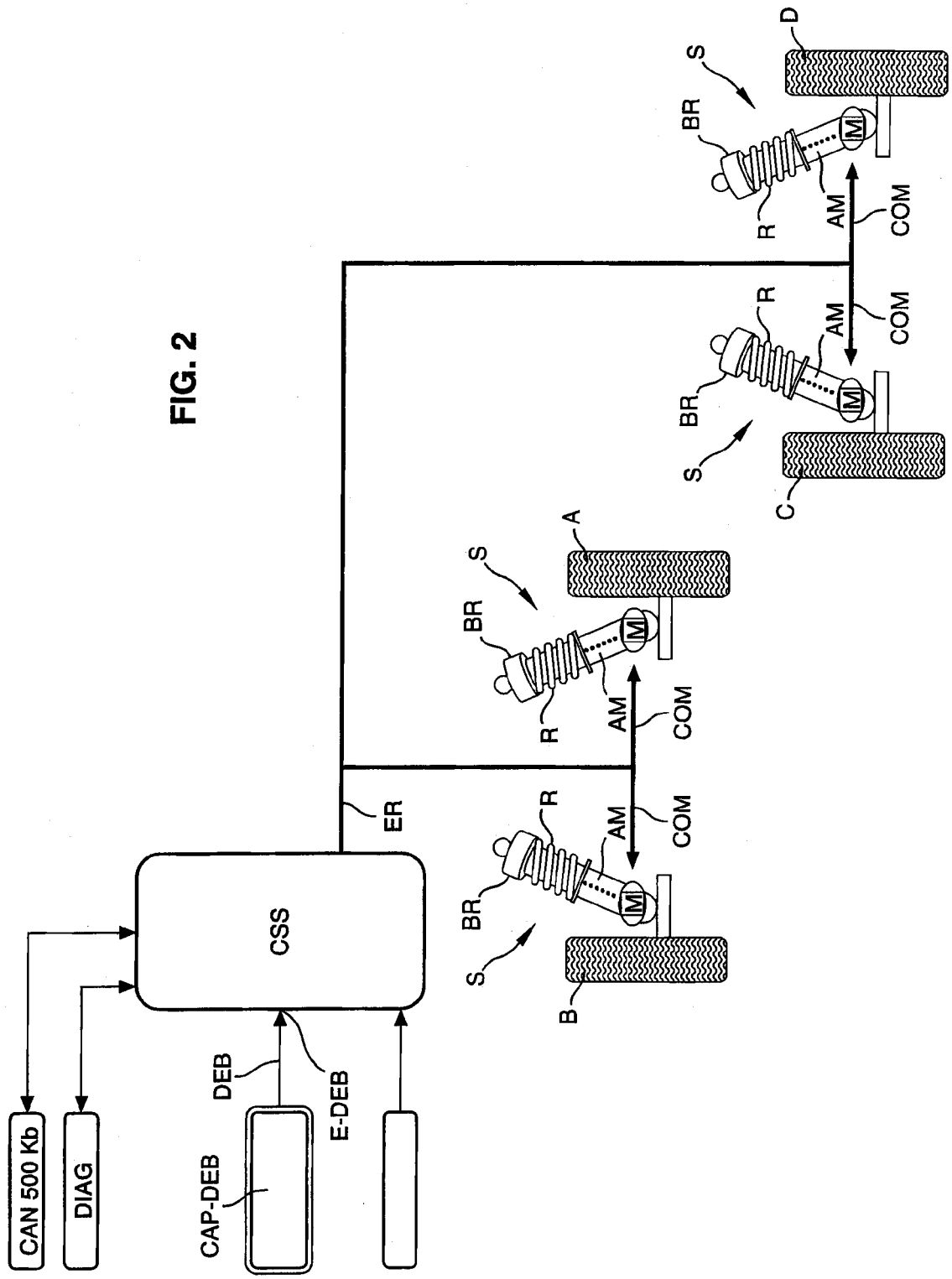
Figure 3:
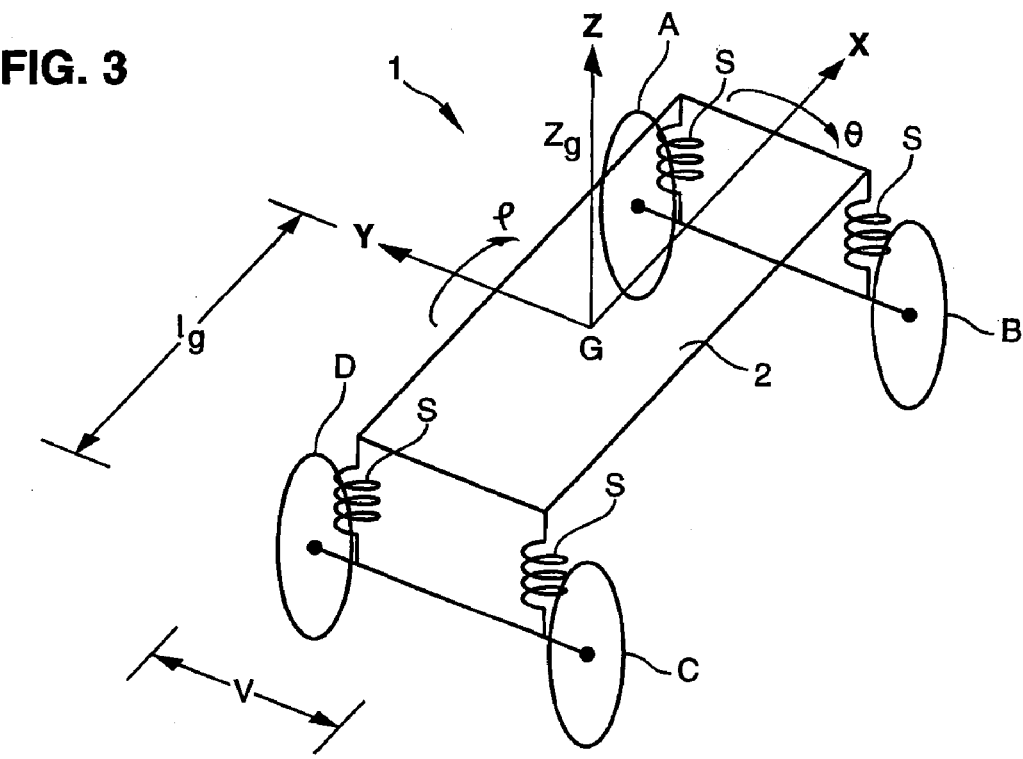
Figure 18:
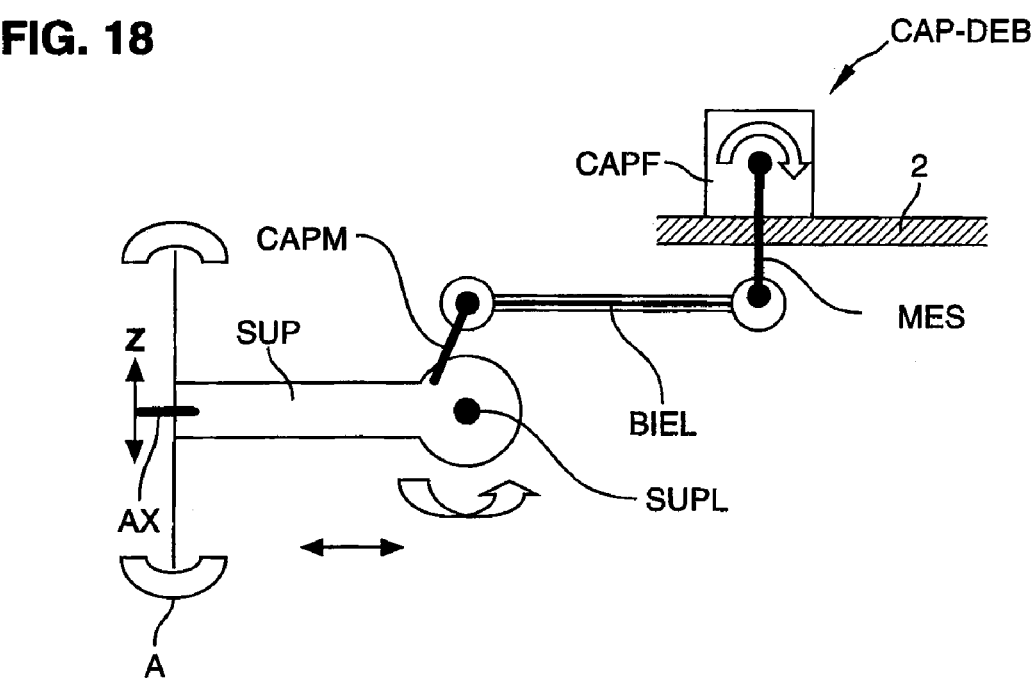
Figure 4:
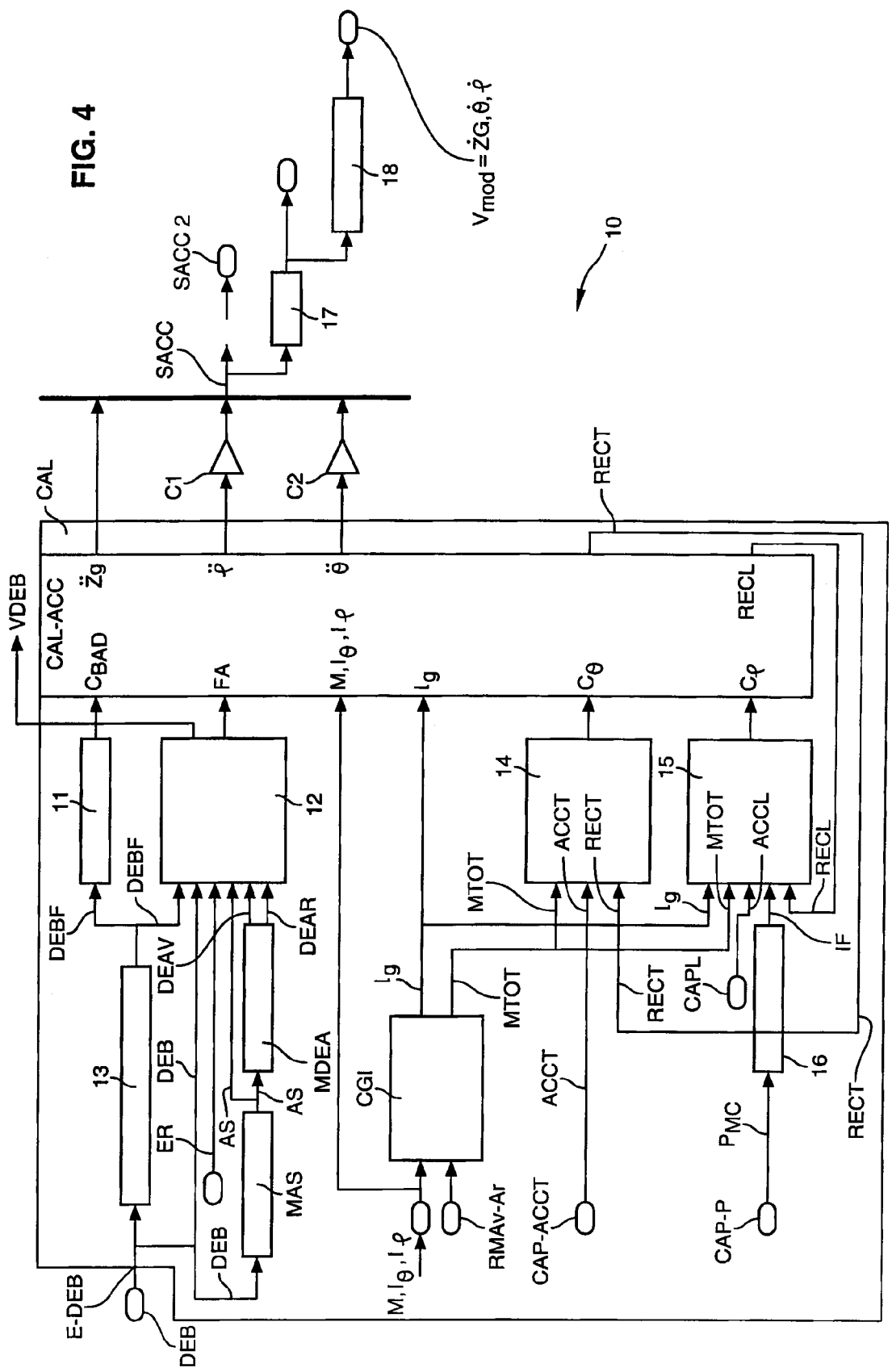
Figure 5:
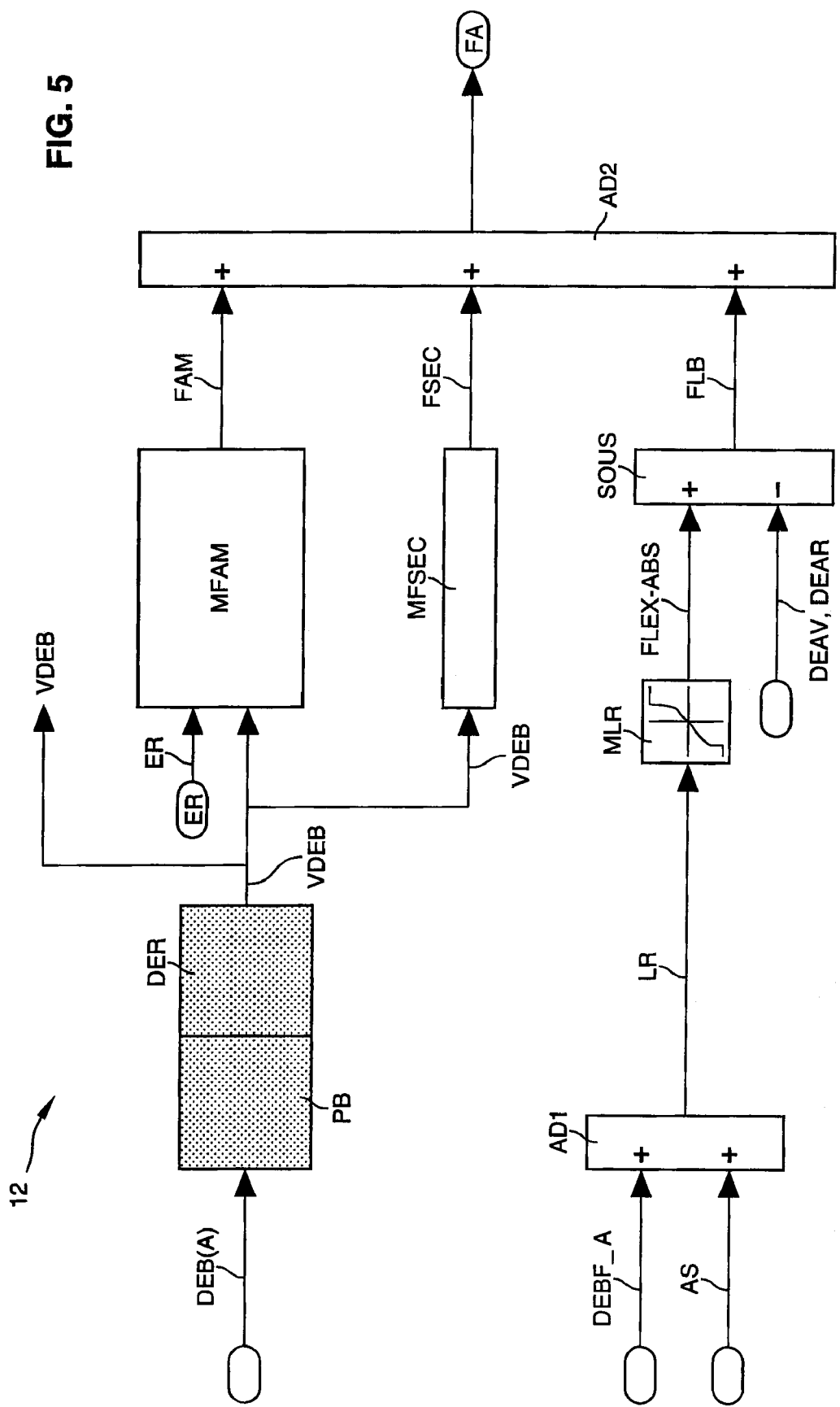
Figure 7:
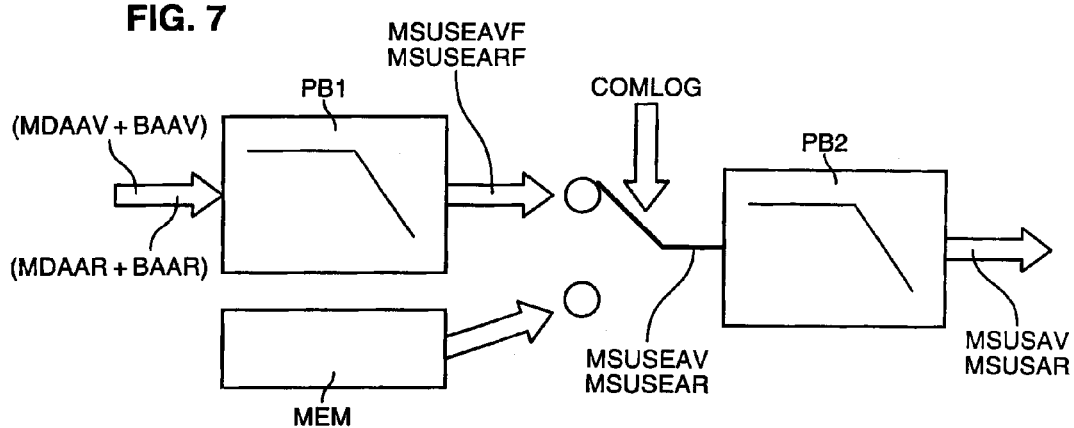
Figure 9:
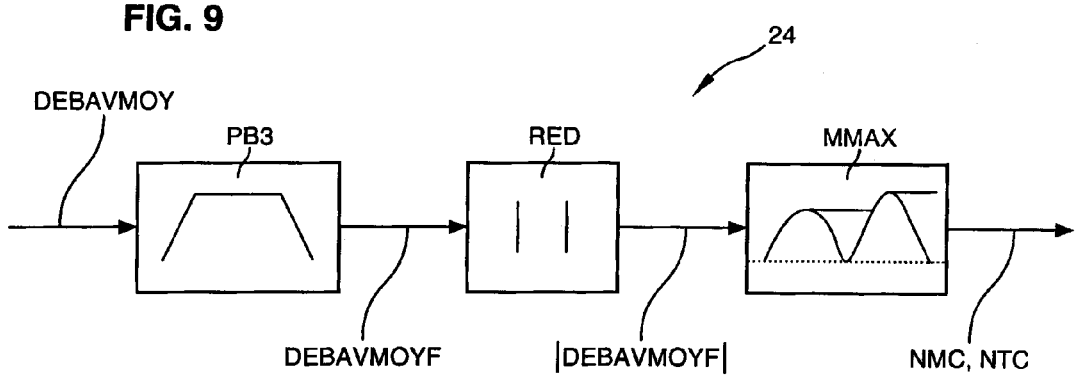
Figure 11:
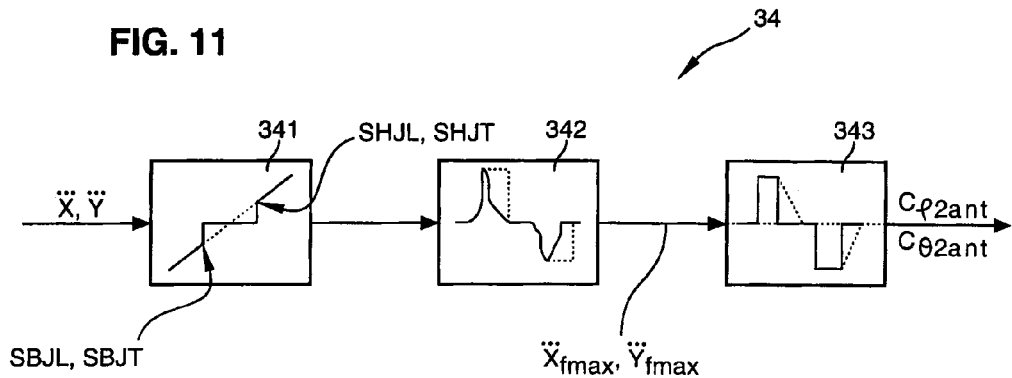
Figure 8:
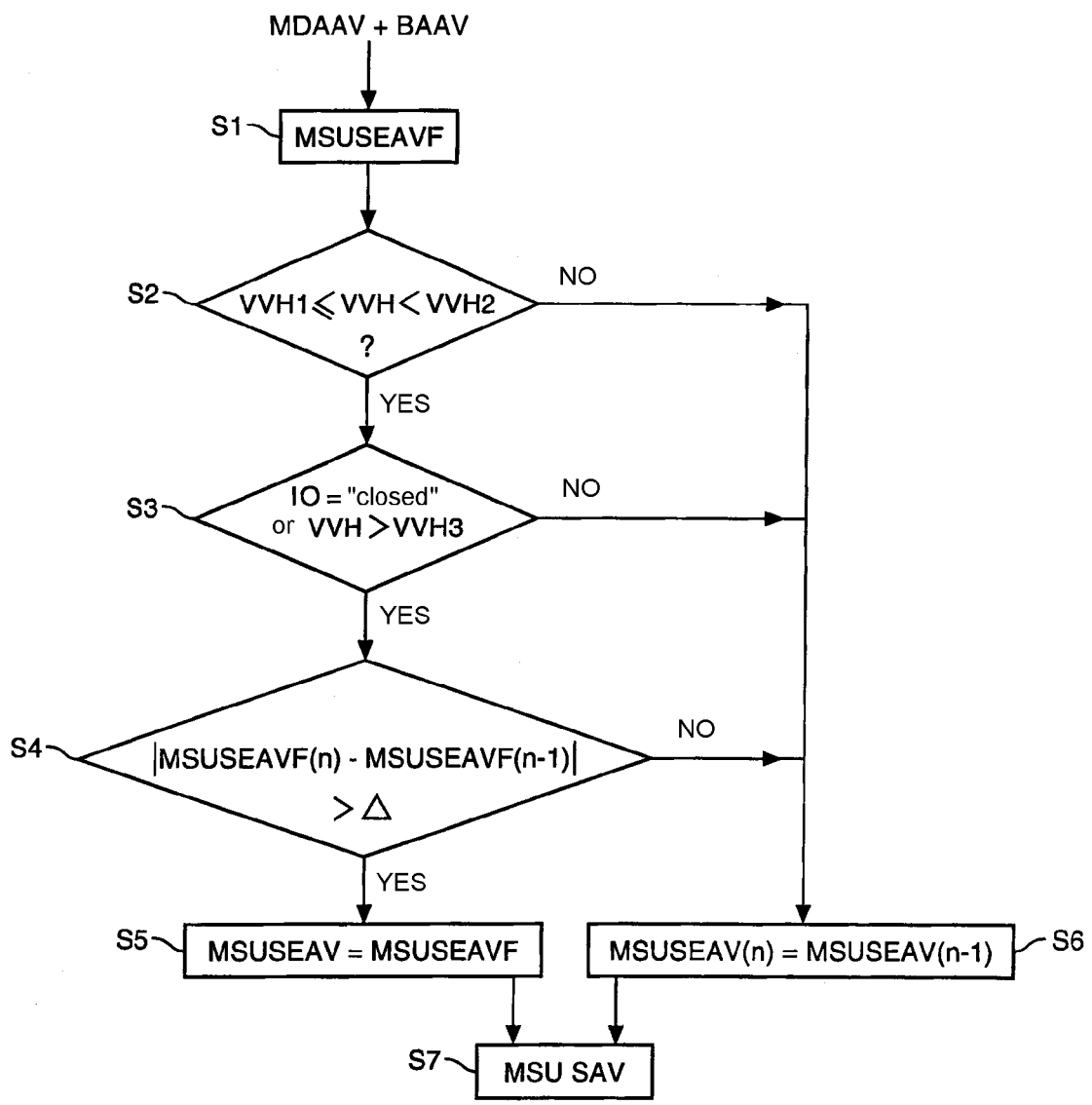
Figure 12:
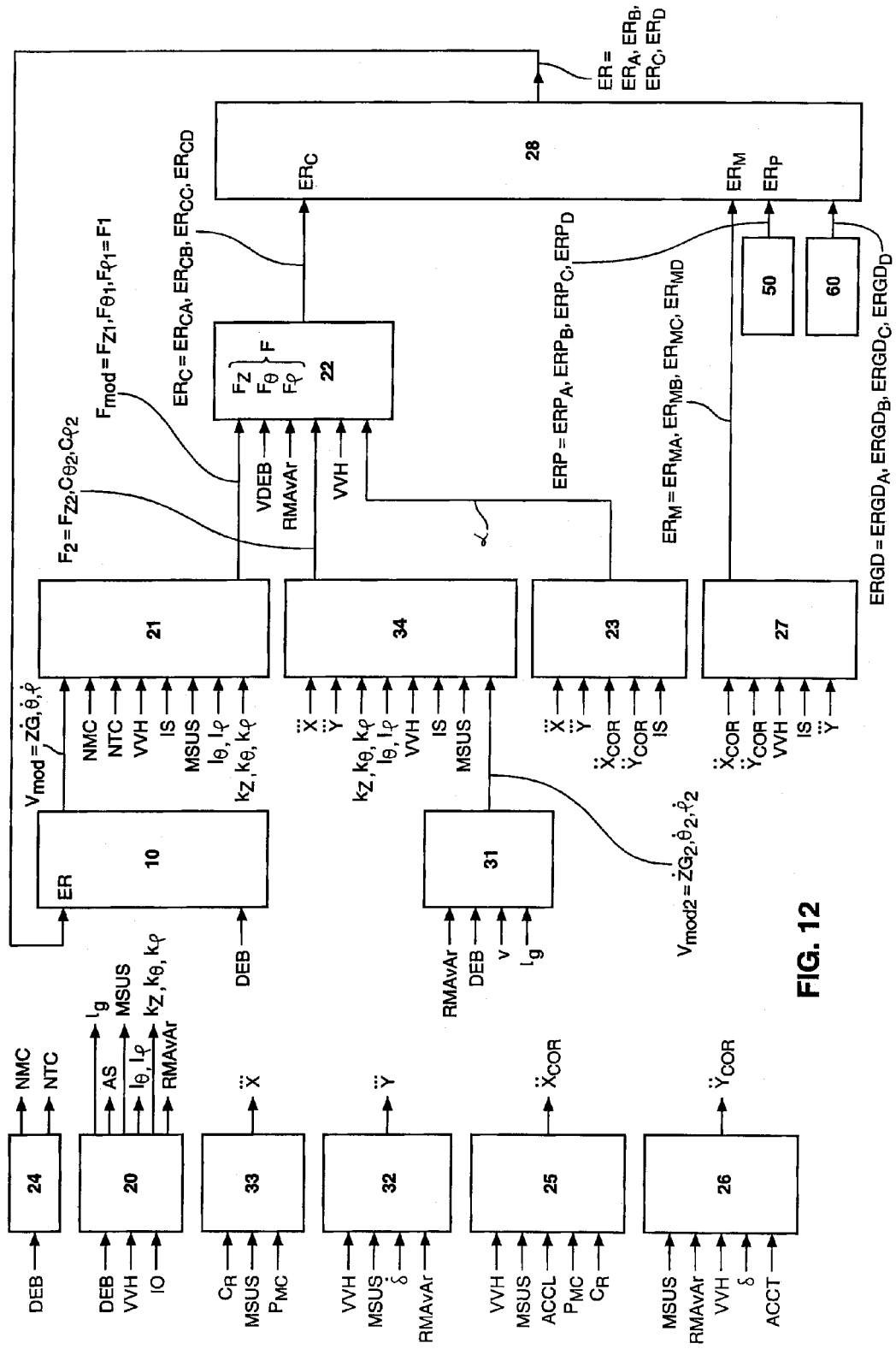
Figure 13:
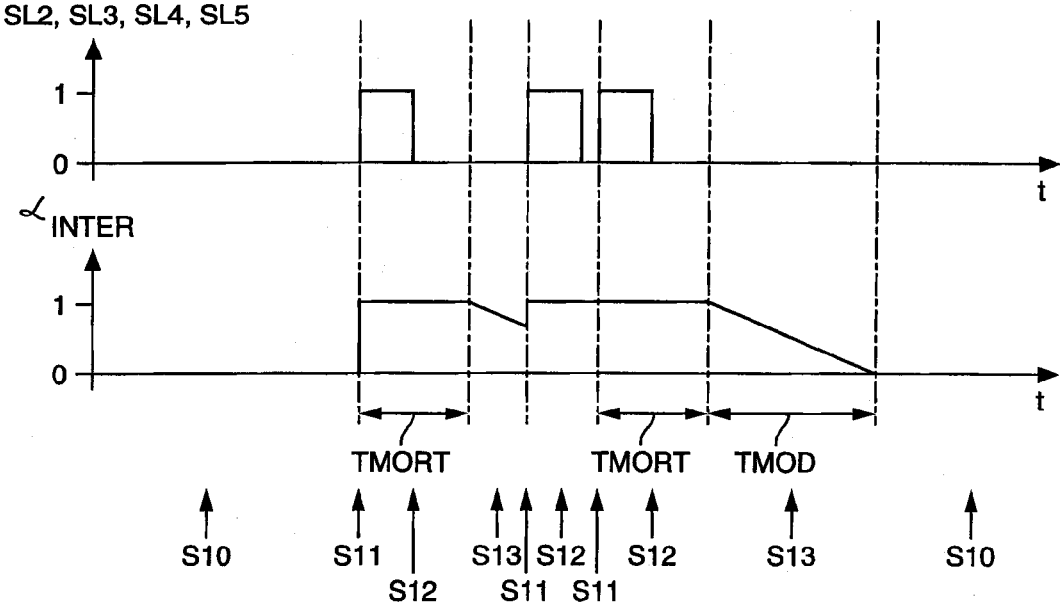
Figure 14:
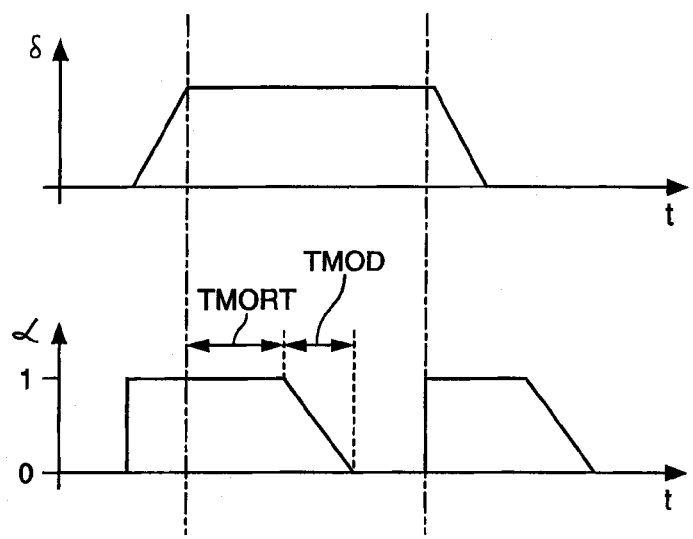
Figure 15:
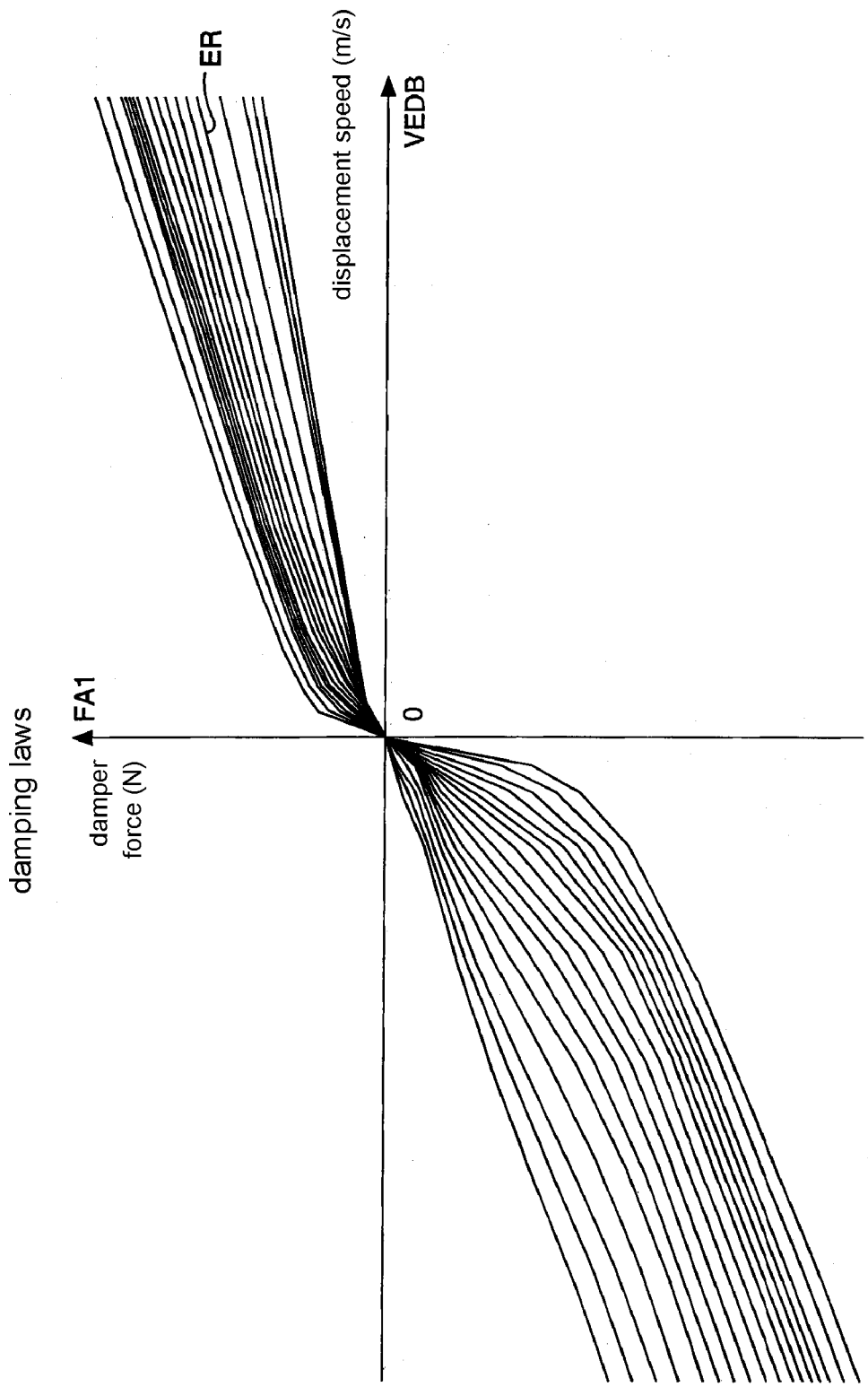
Figure 16:
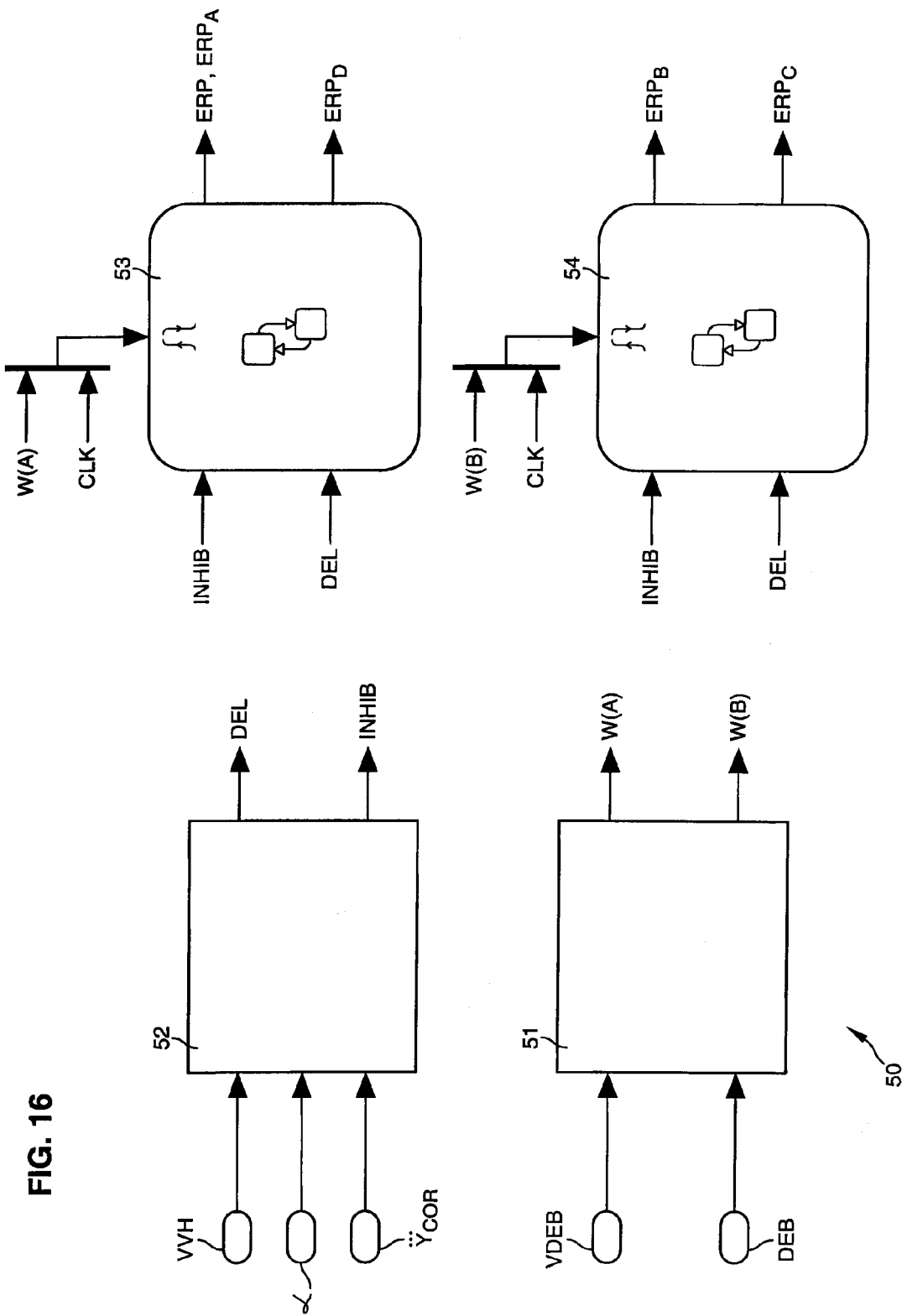

The invention will be more easily understood by reading the following description, given only as a non-limiting example, with reference to the attached drawings, in which:

FIG. 1 is a schematic perspective view of a suspension device of a front axle of a vehicle, FIG. 2 is a functional diagram showing the suspension control device, FIG. 3 is a schematic perspective view of a vehicle body equipped with the suspension on its wheels, FIG. 4 is a modular block diagram of a modal velocity calculation unit of the control device according to the invention, FIG. 5 is a modular block diagram of an estimator provided in the control device according to FIG. 4, FIG. 6 is a modular block diagram of a Skyhook-type unit for calculating modal forces, FIG. 7 is a modular block diagram of a unit for calculating a front- and rear-sprung mass, FIG. 8 is a flow chart of the sprung-mass calculation method of the unit according to FIG. 7, FIG. 9 is a modular block diagram of a unit for calculating levels of movement and bouncing of the body, FIG. 10 is a modular block diagram of a Roadhook-type unit for calculating modal forces, FIG. 11 is a modular block diagram of a unit for calculating anticipatory modal force terms, FIG. 12 is a modular block diagram of a unit for calculating setpoint forces at the wheels, including the Skyhook-type unit for calculating modal forces and the Roadhook-type unit for calculating modal forces, FIG. 13 shows flow charts of demand detection signals and of an intermediate weighting coefficient calculated as a function thereof, to be used in the calculation unit according to FIG. 12, FIG. 14 shows flow charts of the angle of the steering wheel during simple cornering, and of a weighting coefficient between the Skyhook forces and the Roadhook forces, to be used in the calculation unit according to FIG. 12, FIG. 15 shows damping laws for the suspension's variable dampers, FIG. 16 is a modular block diagram of a unit for calculating a damping setpoint law if an impact is detected, FIG. 17 is a modular block diagram of a unit for calculating a damping setpoint law if a large amplitude body movement is detected, FIG. 18 is a transverse section diagram showing the connection of a displacement sensor to the body and to a front or rear wheel.

In FIGS. 1 to 3, the vehicle 1 has a body 2 mounted on four wheels, namely, a left front wheel A, a right front wheel B, a right rear wheel C, and a left rear wheel D.

Each wheel A, B, C, D is connected to the body 2 by its own suspension system S with a spring R between two stops, but it could also be a hydropneumatic suspension.

Each suspension system S has a damper AM equipped with an actuator M controlled by an onboard computer CSS.

This actuator M is a motor, for example, that makes it possible to change the oil passage section in the damper AM. Thus, to each oil passage section in the damper corresponds a different damping law of the latter. These damping laws, also called damping states, are memorized in the form of curves, tables of values, mathematical formulas or otherwise. FIG. 15 shows these damping laws ER, where each damping law is a predetermined curve of the force exerted by the damper toward the body as a function of the displacement speed VDEB of this damper AM, with increasingly stiff laws having greater forces at a constant displacement speed. As an example, the damping states ER are numbered in increasing order for increasingly stiff damping states, i.e., corresponding to an increasingly greater damping force at a constant displacement speed VDEB. Thus, a minimum damping state corresponds to a damping state having a minimal stiffness, i.e., corresponding to a damping force greater than or equal to a minimum for each displacement speed VDEB.

The computer CSS is connected to the vehicle network CAN in order to retrieve a large share of the useful signals (vehicle speed, ABS regulation, lateral and longitudinal accelerations provided by the braking system, sportive mode requested by the driver, supplied by a user interface (built-in systems interface), etc.). It also uses its own sensors (direct wire connections with the sensors) to gauge the movements of the car at each instant. Lastly, it is connected to the actuators, which it controls.

The motor can be a stepper motor, in which case the damper AM has a set number N of discrete damping laws, or a direct current servomotor with position control, in which case the damper AM has an infinite number of damping laws.

For example, the stepper motor actuator can take nine distinct stable positions, which makes it possible to have nine damping laws, from soft to stiff. That is, the smaller the oil passage section, the greater the damping force and the stiffer the damper.

There can be stable laws and unstable laws. For stable laws, it is a matter of controlling the stepper motor so that it finds its angular setpoint value. Once the control process has ended, the stable-law actuator remains in this position even if it is no longer under power. Conversely, for unstable laws, the motor must be kept under power in order to remain in this law. For example, in one embodiment, there are both stable laws and unstable laws, e.g., with the unstable laws being positioned between consecutive stable laws. For example, in FIG. 15, nine stable laws and eight unstable laws are present. In another embodiment, all the laws are stable, e.g., with 16 stable laws.

Each actuator M has a control input COM connected to the computer CSS so as to receive from the latter a control magnitude ER selecting a position of the actuator M from among multiple positions, in order to apply a preset damping law corresponding to this position.

According to the invention, a displacement sensor CAP-DEB is provided on at least one of the vehicle wheels A, B, C, D, and preferably on each wheel A, B, C, D. Each sensor CAP-DEB thus measures the displacement DEB of its associated wheel with respect to the body 2.

The wheel displacement sensors CAP-DEB are angular, for example, and give the instantaneous value of the angle between the wheel rotation axle and the body 2. For example, in FIGS. 1 and 18, each displacement sensor CAP-DEB has a fixed part CAPF such as a housing, attached to the body 2, and a mobile part CAPM connected to an element attached to the wheel. A connecting rod BIEL joins the mobile part CAPM to the fixed part CAPF and drives the rotation of an angular measurement member MES contained in the fixed part CAPF when the wheel moves up or down relative to the body 2. The mobile part CAPM is fixed on a supporting element SUP for the wheel rotation axle AX, for example. This supporting element SUP is mobile about an axis SUPL that is substantially longitudinal relative to the body 2. The mobile part CAPM is fixed on the supporting element SUP at a distance from its rotation axis SUPL.

The displacement measurements DEB for the wheels A, B, C, D are sent from the sensors CAP-DEB to the computer CSS, which has corresponding inputs E-DEB.

Modal Accelerations

From the wheel displacement measurements DEB, the computer CSS calculates the heave modal acceleration $\ddot{z}G$ of the body, the angular roll modal acceleration $\ddot{\theta}$ and the angular pitch modal acceleration $\ddot{\varphi}$ with the formulas below.

$$\begin{cases} \ddot{z}G = \dfrac{FA + FB + FC + FD}{M} \\ \ddot{\theta} = \dfrac{\dfrac{v}{2}(FB + FC - FA - FD) + C_{BAD} + C_\theta}{I_\theta} \\ \ddot{\varphi} = \dfrac{(e - lg)(FC + FD) - lg(FA + FB) + C_\varphi}{I_\varphi} \end{cases}$$

where G is the center of gravity of the body 2, zG is the altitude of G in an ascending vertical direction Z, θ is the roll angle of the body 2 around a longitudinal axis X passing through G and oriented from the rear toward the front, φ is the pitch angle of the body 2 around a transverse axis passing through G and oriented from right to left, with axes X, Y, Z forming an orthonormal reference.

FA, FB, FC, FD are the forces exerted by the respective wheels A, B, C, D on the body 2 via their suspensions S.

v is the track width of the body 2, that is, the distance between the right wheels and the left wheels in the transverse direction, e is the wheel base of the vehicle, lg is the longitudinal distance between the center of gravity G and the transverse axle of the front wheels A and B, M is the predetermined mass of the body 2 with no vehicle occupant.

$I_\theta$ is the roll moment of inertia, and $I_\varphi$ is the pitch moment of inertia.

CBAD is a torque exerted by the anti-roll bar BAD on the body 2.

$C_\theta$ is a roll torque, and $C_\varphi$ is a pitch torque.

Described below are the various calculation means used in implementing the control method according to the invention.

The method of calculating modal accelerations in the computer CSS is implemented by module 10 shown in FIGS. 4 and 5, for example.

The module blocks described in the figures are implemented in the computer CSS using any appropriate automatic means, software in particular.

Module 10 has a first calculation means CAL for the modal accelerations $\ddot{z}G$, $\ddot{\theta}$ and $\ddot{\varphi}$, which receives the wheel displacement measurements DEB as input.

The calculation means CAL comprises:

an estimator 11 for the torque $C_{BAD}$ generated by the anti-roll bar BAD, an estimator 12 of the forces FA, FB, FC, FD exerted by the respective wheels A, B, C, D on the body 2, a filter 13 for the displacement measurement DEB sent as input to the calculation means CAL.

The filter 13 eliminates the low frequencies from the displacement measurement DEB provided by the sensors CAP-DEB.

For example, this filter 13 has a high-pass filter with a low cutoff frequency greater than or equal to 0.2 Hz. The filter 13 can be embodied as a bandpass filter that additionally has a high cutoff frequency, e.g., greater than or equal to 8 Hz, which makes it possible to retain an adequately constant phase in the bandwidth.

The filtered wheel displacement DEBF provided at the filter 13 output from the wheel displacement measurement DEB is sent to the estimator 11 input, and to another estimator 12 input. From the four displacement measurements DEB (A), DEB(B), DEB(C), DEB(D) provided by the sensors CAP-DEB on the respective wheels A, B, C, D, the filter 13 provides four filtered displacement measurements DEBF(A), DEBF(B), DEBF(C), DEBF(D).

Anti-Roll Bar

The estimator 11 calculates the anti-roll bar torque $C_{BAD}$ as a function of the filtered displacement values DEBF provided by the filter 13 as follows:

for the left front wheel:

$C_{BAD}(A) = (DEBF(A) - DEBF(B)) \cdot (Kbadav)/v^2$, for the right front wheel:

$C_{BAD}(B) = -C_{BAD}(A)$, for the left rear wheel:

$C_{BAD}(D) = (DEBF(D) - DEBF(C)) \cdot (Kbadar)/v^2$, for the right rear wheel:

$$C_{BAD}(C) = -C_{BAD}(D),$$

where Kbadav is a predetermined parameter corresponding to the stiffness of the front anti-roll bar BAD,
Kbadar is a predetermined parameter corresponding to the stiffness of the rear anti-roll bar, not shown.

Suspension Load

The suspension load estimator 12 has an input for the filtered displacements DEBF, an input for the unfiltered displacements DEB, an input for the actual state ER of the actuator, meaning the damping law ER it is currently implementing, this actual state and its changes being memorized, for example, an input DEAV for static front wheel load and an input DEAR for static rear wheel load.

This estimator 12 is described below in FIG. 5 as an example for calculating the suspension load FA on the left front wheel A. Of course, the calculation is comparable for the other loads FB, FC, FD, replacing those elements relating specifically to wheel A with values corresponding to wheel B, C, or D.

In the estimator 12, the displacement DEB(A) measured by the sensor CAP-DEB on the wheel A is sent to a low-pass filter PB that limits the bandwidth of the displacement DEB (A), followed by a derivation module DER to obtain the displacement speed VDEB for wheel A. The displacement speeds VDEB of the wheels are provided at an output of the estimator 12 and the module 10.

A calculation module MFAM for the damping force FAM exerted by the damper AM on the body 2 receives as input the actual state ER and the displacement speed VDEB of the wheel in question. The damping laws for the dampers AM are memorized in advance, for example, or they can be recalculated once the state ER has been specified. With each of the damping laws ER, the displacement speed VDEB can be calculated or determined as a function of the damping force FAM exerted by the damper AM, and vice versa. From the state ER, the module MFAM determines the damping law currently in use for the wheel A damper AM, and from the wheel A displacement speed VDEB(A) for this selected law, the module determines the wheel A damping force FAM, e.g., by reading the curve for this law.

Another module MFSEC for calculating a dry friction force FSEC for the wheel A damper AM also receives the wheel A displacement speed VDEB as input and calculates the dry friction force FSEC using the following formula:

$$Fsec = (FsAv) \cdot \tanh(VDEB/10^{-2})$$

where VDEB is in cm/s and FsAv is a dry friction coefficient for the front wheels, previously calculated on a test bench, and equal to around 200 Newtons, for example.

This friction coefficient is replaced with a friction coefficient FsAr for the rear wheels.

Static Characteristics Estimator

A module MAS for calculating the static attitude AS receives the displacements DEB of the four wheels A, B, C, D as input, and from the latter, it calculates the static attitude AS, which represents the static equilibrium point of the suspension S when the vehicle is immobile on a horizontal surface. This module MAS calculates a front static attitude ASav and a rear static attitude ASar. The front static attitude ASav, for example, can be calculated as the mean displacement DEBAVMOY (half-sum) of the displacements DEB of the front wheels A, B, filtered through a low-pass filter, e.g., a second-order Butterworth-type filter, and then a front attitude offset constant is added to this filtered mean displacement. The rear static attitude ASar, for example, can be calculated as the mean displacement DEBARMOY (half-sum) of the displacements DEB of the rear wheels C, D, filtered through a low-pass filter, e.g., a second-order Butterworth-type filter, and then a rear attitude offset constant is added to this filtered mean displacement. It is assumed that the displacement sensor CAP-DEB is calibrated to measure the displacement with respect to this static attitude AS. An adder AD1 adds the filtered displacement DEBF-A for wheel A to the static attitude AS calculated for wheel A, i.e., the front static attitude, to obtain the actual length LR of the spring R associated with wheel A.

The module MAS for calculating the static attitude AS is, for example, part of a static characteristics estimator 20 shown in FIG. 6, which receives as input the displacements DEB of the four wheels A, B, C, D, a front static pressure and a rear static pressure in the case of a hydropneumatic suspension, the vehicle speed VVH, and an opening panel information unit 10. The vehicle speed VVH is provided by a speed sensor, for example, or any other calculation means.

The static characteristics estimator 20 includes:
a means for calculating a front apparent dynamic mass MDAAV and a rear apparent dynamic mass MDAAR as a function of the displacements DEB,
a means for calculating a front aerodynamic bias BAAV and a rear aerodynamic bias BAAR from the vehicle speed VVH,
a means for calculating the vehicle's sprung mass MSUS and a value for mass distribution RMAvAr between the front and rear of the vehicle, as a function of the front apparent dynamic mass MDAAV the rear apparent dynamic mass MDAAR, the front aerodynamic bias BAAV and the rear aerodynamic bias BAAR.
a means for calculating the roll moment of inertia $I_\theta$ and the pitch moment of inertia $I_\varphi$ as a function of the sprung mass MSUS and the rear sprung mass MSUSAR,
a means for calculating the distance Ig between the center of gravity G and the front wheel A, B axle,
a means for calculating a heave modal stiffness $k_z$, a pitch modal stiffness $k_\varphi$ and a roll modal stiffness $k_\theta$ as a function of the static attitude AS and the front-rear mass distribution value RMAvAr.

The front apparent dynamic mass MDAAV is calculated by
calculating the relative front displacement, which is equal to the mean displacement (half-sum) of the displacements DEB of the front wheels A, B, to which a front offset constant is then added,
retrieving a spring flexure front dynamic load value EDFAV from a recorded table or curve that gives this load EDFAV as a function of front relative displacement,
calculating the front apparent dynamic mass MDAAV with the formula:

$$MDAAV = (EDFAV \cdot 2/g) + \text{front constant},$$

where g is the gravity acceleration constant=9.81 m/s$^{-2}$.

The rear apparent dynamic mass MDAAR is calculated by
calculating the relative rear displacement, which is equal to the mean displacement (half-sum) of the displacements DEB of the rear wheels C, D, to which a rear offset constant is then added,
retrieving a spring flexure rear dynamic load value EDFAR from a table or recorded curve that gives this load EDFAR as a function of relative rear displacement,
calculating the rear apparent dynamic mass MDAAR with the formula:

$$MDAAR = (EDFAR \cdot 2/g) + \text{rear constant}.$$

The spring flexure dynamic load is zero in the spring's equilibrium position, corresponding to its static position, with relative front displacement being the displacement with respect to the static equilibrium position; the value is retrieved by interpolation from the table, for example, but it can also be obtained from a recorded curve of EDFAV, EDFAR.

For a hydropneumatic suspension, the mass MDAAR and the mass MDAAV are calculated using the front static pressure and the rear static pressure.

The front aerodynamic bias BAAV, analogous to a mass in kg, is calculated with the formula:

$$BAAV=(CAV \cdot VVH^2)/g,$$

where CAV is a predetermined front aerodynamic coefficient.

The rear aerodynamic bias BAAR, analogous to a mass in kg, is calculated with the formula:

$$BAAR=(CAR \cdot VVH^2)/g,$$

where CAR is a predetermined rear aerodynamic coefficient.

Calculating the Vehicle Sprung Mass MSUS and the Mass Distribution Value RMAvAr

First a front axle sprung mass MSUSEAV is calculated. In order to do this, as shown in FIGS. 7 and 8, in stage S1, the sum (front apparent dynamic mass MDAAV+front aerodynamic bias BAAV) is filtered through a low-pass filter PB1 to obtain a filtered front axle sprung mass MSUSEAVF.

Then the following is checked:
in stage S2, whether the vehicle speed VVH is between a preset low threshold VVH1 and a preset high threshold VVH2,
in stage S3, whether the opening panel information unit IO is "closed" or the vehicle speed VVH is greater than a prescribed threshold VVH3,
in stage S4, whether the difference between the filtered front axle sprung mass MSUSEAVF(n) and its value MUSSEAVF(n−1) previously recorded in the memory is high enough (greater in absolute value than a prescribed difference Δ).

If these conditions are met, the front axle sprung mass MSUSEAV is taken to be equal to the filtered front axle sprung mass MSUSEAVF and is recorded in the memory MEM in step S5 and in the position of the logic switch COMLOG shown in FIG. 7.

If one, multiple or all of these conditions are not met, the front axle sprung mass MSUSEAV(n) is unchanged and remains equal to the value MSUSEAV(n−1) previously recorded in the memory MEM, in step S6 and in the other position of the logic switch COMLOG.

Then in stage S7, a front sprung mass MSUSAV is calculated by filtering the front axle sprung mass MSUSEAV through a low-pass filter PB2, and optionally by saturating the values obtained through this filter above a high threshold and below a low threshold.

The low-pass filters PB1 and PB2 are first order, for example, each with a cutoff frequency of 0.02 Hz.

The procedure is comparable for calculating the rear axle sprung mass MSUSEAR and the rear sprung mass MSUSAR, by replacing MDAAV+BAAV with MDAAR+BAAR and replacing MSUSEAVF with MSUSEARF.

The vehicle sprung mass MSUS is then calculated by adding together the front sprung mass MSUSAV and the rear sprung mass MSUSAR $$MSUS=MSUSAV+MSUSAR$$

The front-rear mass distribution value RMAvAr is then calculated by dividing the front sprung mass MSUSAV by the vehicle sprung mass MSUS $$RMAvAr=MSUSAV/MSUS$$

Calculating the Moments of Inertia

The roll moment of inertia $I_\theta$ is calculated as a function of the rear sprung mass MSUSAR using the formula $$I_\theta = A_y \cdot MSUSAR + B_y$$

with MSUSAR=(1−RMAvAr)·MSUS,
where $A_y$ and $B_y$ are preset parameters.

The pitch moment of inertia $I_\phi$ is calculated as a function of the sprung mass MSUS using the formula $$I_\phi = A_x \cdot MSUS + B_x$$

where $A_x$ and $B_x$ are preset parameters.

Calculating the Distance Ig and the Modal Stiffnesses

A front suspension stiffness kAV and a rear suspension stiffness kAr are calculated.

The front suspension stiffness kAV is obtained by using the prerecorded table or curve that gives the front suspension stiffness as a function of the front static attitude to retrieve the front stiffness value corresponding to the front static attitude ASav, e.g., using linear interpolation.

The rear suspension stiffness kAR is obtained by using the prerecorded table or the curve that gives the rear suspension stiffness as a function of the rear static attitude to retrieve the rear stiffness value corresponding to the rear static attitude ASar, e.g., using linear interpolation.

The distance Ig is calculated with the following formula:

$$Ig=(1-RMAvAr) \cdot e$$

The module CGI in FIG. 4 performs this calculation of the distance Ig, and is part of the estimator 20, for example.

The heave modal stiffness $k_z$ is calculated as the sum of the front suspension stiffness kAV and the rear suspension stiffness kAR $$k_z = kAV + kAR$$

The pitch modal stiffness $d_\phi$ is calculated using the formula $$k_\phi = kAV \cdot (Ig)^2 + kAR \cdot (e-Ig)^2$$

The roll modal stiffness $k_\theta$ is calculated using the formula $$k_\theta = Kbadav + Kbadar + v^2 \cdot (kAV + kAR)/4$$

Calculating the Modal Accelerations of the Body

In FIG. 5, a module MLR uses a recorded table or curve that gives a flexure force as a function of the length of the spring R to calculate the absolute flexure force FLEX-ABS corresponding to the actual input value LR of this length. This recorded curve of flexure force also takes the suspension stops into account, which are made of rubber, for example, and which exert a larger force on the body when the spring is pushing on these stops at the damper's AM end of travel.

In addition, a module MDEA receives the static attitude AS as input and from the latter, it calculates the corresponding static flexure load DEAV on the front wheels and the corresponding static flexure load DEAR on the back wheels.

From the absolute flexure force FLEX-ABS a subtractor SOUS subtracts the static force DEAV or DEAR, i.e., the force DEAV, in the case of the front wheel A, to obtain a flexure force FLB for suspension springs and stops, corresponding to the force exerted by the spring R and the end stops on the body 2.

An adder AD2 adds the damping force FAM, the dry friction force FSEC, and the flexure force FLB for the springs and the suspension stops to obtain the force FA using the following formula:

$$FA=FAM+FSEC+FLB.$$

A module CAL-ACC receives as input the torque $C_{BAD}$ calculated by the module 11, the suspension forces FA, FB, FC, FD calculated by the estimator 12, the mass M of the body, the roll moment of inertia $I_\theta$ and the pitch moment of inertia $I_\phi$, which are prerecorded, in order to calculate the modal accelerations $\ddot{z}G$, $\ddot{\theta}$ and $\ddot{\phi}$ as a function therefrom, disregarding the influence of the torques $C_\theta$ and $C_\phi$, i.e., by having $C_\theta=0$ and $C_\phi=0$, in one embodiment.

In the improvement described below, the torques $C_\theta$ and $C_\phi$ are taken into account in calculating the modal accelerations.

A module CGI for calculating the inertia magnitude calculates, as a function of M, $I_\theta$, $I_\phi$ and an input value for front-rear mass distribution RMAvAr, a total vehicle mass MTOT=MREF, figuring in a standardized load for the vehicle, e.g., four people weighing 67 kg in the vehicle passenger compartment, and 28 kg of luggage in the rear trunk, and the distance Ig between the center of gravity G and the front wheel A, B axle, which is input into the module CAL-ACC. The mass distribution value RMAvAr is continuously estimated using the displacement values DEB provided by the displacement sensors CAP-DEB and comparing each of these values to a calculated mean displacement DEB.

An accelerometer CAP-ACCT is provided on the vehicle in order to supply a transverse acceleration ACCT to a roll torque $C_\theta$ estimator 14, which also receives as input the total mass MTOT and a transverse acceleration ACCT reset value RECT.

The transverse accelerometer CAP-ACCT is positioned at the center of gravity G, not at the roll center CR. The transverse acceleration reset value RECT is calculated by the module CAL-ACC as follows:

$$RECT(n)=ACCT(n)-\ddot{\theta}(n-1)\cdot(HCdG-hRoulis)$$

where $\ddot{\theta}$ is the unfiltered roll acceleration, and where n indicates the value of the variable in the current cycle and (n−1) indicates the value of the variable in the previous cycle.

The estimator 14 calculates the roll torque $C_\theta$ using the following formula:

$$c_\theta=(ACCT-RECT)\cdot(MTOT)\cdot d(G,CR)$$

where d(G,CR)=HCdG−hRoulis is the distance between the center of gravity G and the roll center CR, and is prerecorded.

A pitch torque $C_\phi$ estimator 15 receives as input the distance Ig, the total mass MTOT, a longitudinal acceleration ACCL provided by a longitudinal accelerometer CAPL placed in the vehicle body, a braking information unit IF and a longitudinal acceleration reset value RECL calculated by the module CAL-ACC.

The longitudinal acceleration reset value RECL is calculated by the module CAL-ACC as follows:

$$RECL(n)=ACCL(n)-\ddot{\phi}(n-1)\cdot(HCdG)$$

where $\ddot{\phi}$ is the unfiltered pitch acceleration.

The estimator 15 calculates the pitch torque $C_\phi$ using the following formula:

$$c_\phi=(ACCL-RECL)\cdot(MTOT)\cdot h_G+c_{\phi B}$$

$h_G$=HCdG represents the height of the center of gravity G on the Z axis with respect to the pitch center CT, and is prerecorded.

The torque $c_\phi$ component $c_{\phi B}$ is the component of pitch torque due to the Brouilhet effect, and is calculated as a function of the braking information unit IF. A determination module 16 provides this braking information unit IF as a function of a master cylinder pressure value $P_{MC}$, which is itself provided by a brake master cylinder pressure sensor CAP-P.

The calculated values of the torques $C_\theta$ and $C_\phi$ are input into the module CAL-ACC, which uses these values and the other input values to perform calculations and produces heave modal acceleration $\ddot{z}G$, roll modal acceleration $\ddot{\theta}$ and pitch modal acceleration $\ddot{\phi}$ as output, as well as the reset values RECT and RECL. The roll modal acceleration $\ddot{\theta}$ and the pitch modal acceleration $\ddot{\phi}$ are respectively sent to two converters C1 and C2 of degrees into radians per second, and are then sent with $\ddot{z}G$ to an output SACC for the three unfiltered modal accelerations, and from there to an output SACC2 from module 10 to the outside.

In addition, these three modal accelerations at the module 10 output SACC are each sent to a filter 17 that eliminates the low frequencies below a low cutoff frequency of 0.1 Hz, 0.2 Hz or 0.3 Hz, for example. The filter 17 can have a low-pass component, for example, in addition to this high-pass component, to form a bandpass filter. The low cutoff frequency of the filter 17 can vary depending on the modal acceleration $\ddot{z}G$, $\ddot{\theta}$ or $\ddot{\phi}$.

The filtered modal accelerations from the output of the filter 17 are then sent to an integrator module 18 having a high-pass filter at its output, which yields the estimated body modal velocities, namely, the body heave modal velocity $\dot{z}G$, the body roll modal velocity $\dot{\theta}$, and the body pitch modal velocity $\dot{\phi}$ at an output of module 10.

These body heave $\dot{z}G$, roll $\dot{\theta}$ and pitch $\dot{\phi}$ modal velocities are absolute velocities with respect to a Galilean reference frame, and are called first body modal modal velocities for Skyhook comfort logic.

The computer CSS then calculates the control magnitude ER for the damper AM actuator M for wheel A and for the other wheels B, C, D as a function of these calculated modal velocities $\dot{z}G$, $\dot{\theta}$ and $\dot{\phi}$, and provides the control magnitudes ER thus calculated to the corresponding actuators M at their control inputs COM.

"Skyhook"-Type Control

Below we describe the calculation of a variable damping modal gain $b_{mod}$ and a first modal setpoint force $F_{mod}$ for the damper for comfort-based or "Skyhook" damping control.

This Skyhook-type logic uses the first absolute body modal velocities—heave $\dot{z}G$, roll $\dot{\theta}$ and pitch $\dot{\phi}$—produced by the module 10, designated by the general symbol $V_{mod}$ in the following.

Body Movement and Body Bounce Levels

An estimator 24 is provided for calculating a level NMC of body movement and a level NTC of body bounce as a function of the wheel displacements DEB.

In FIG. 9, the body movement level NMC and the body bounce level NTC are obtained in the estimator 24 by:

calculating the mean displacement DEBAVMOY for the front wheels A, B, filtering the front mean displacement DEBAVMOY through a bandpass filter PB3 to obtain a filtered value |DEBAVMOYF|, taking the absolute value of the filtered value |DEBAVMOYF|, in a rectifier module RED, to obtain a rectified value |DEBAVMOYF|, keeping the maxima of the rectified value |DEBAVMOYF| in a maintenance module MMAX, which provides the body movement level NMC.

For calculating the body movement level NMC, the bandpass filter PB3 is set so that the body movement frequencies, which are relatively low, can pass through. The body movement bandpass filter PB3 is set from 0.5 to 2.5 Hz, for example, and is close to the resonant frequency of the suspension. It can be set between two slopes, for example, to obtain an attenuated movement level NMC and a non-attenuated movement level NMC.

In order to calculate the body bounce level NTC, the bandpass filter PB3 is set so that the body bounce frequencies, which are relatively high, can pass through. The body bounce bandpass filter PB3 is set with a low cutoff frequency of 3 Hz, for example, and a high cutoff frequency of 8 Hz or more. It can be set between two slopes, for example, in order to obtain an attenuated bounce level NTC and a non-attenuated bounce level NTC.

The maintenance module MMAX can have a parameter-adaptive downslope and a parameter-adaptive dwell time for maintaining the maxima. The selected dwell time for maintaining the maxima is shorter for obtaining the body bounce level NTC than for obtaining the body movement level NMC.

Skyhook Modal Setpoint Forces and Modal Gains

An estimator 21 is provided for calculating the variable damping modal gains $b_{mod}$ and the first modal damping setpoint forces $F_{mod}$, using the formula $F_{mod} = -b_{mod} \cdot V_{mod}$.

There is thus:
a heave modal gain $b_z$ for calculating the first heave modal force $F_{z1} = -b_z \cdot \dot{z}G$
a roll modal gain $b_\theta$ for calculating the first roll modal force $F_{\theta 1} = -b_\theta \cdot \dot{\theta}$
a pitch modal gain $b_\phi$ for calculating the first pitch modal force $F_{\phi 1} = -b_\phi \cdot \dot{\phi}$ The modal gains $b_z$, $b_\theta$, $b_\phi$ vary as a function of the displacements DEB of the wheels A, B, C, D and are calculated by the estimator 21 from the values that were previously calculated as a function of these wheel A, B, C, D displacements DEB.

The modal gains $b_z$, $b_\theta$, $b_\phi$ can comprise one or more multiplier coefficients, with the following multiplier coefficients as an example:
a reference multiplier coefficient $b_{zREF}$, $b_{\theta REF}$, $b_{\phi REF}$, for heave, roll and pitch, respectively
an attenuation multiplier coefficient $b_{zATT}$, $b_{\theta ATT}$, $b_{\phi ATT}$, for heave, roll and pitch,
a reset multiplier coefficient $b_{zREC}$, $b_{\theta REC}$, $b_{\phi REC}$, for heave, roll and pitch, respectively,
a driving mode multiplier coefficient $b_{zTYP}$, $b_{\theta TYP}$, $b_{\phi TYP}$, for heave, roll and pitch, respectively.

In the embodiment shown in FIG. 6, the estimator 21 receives the following values as input:
the body movement level NMC provided by the estimator 24,
the body bounce level NTC provided by the estimator 24,
the vehicle speed VVH,
the modal stiffnesses provided by the estimator 24: the heave stiffness $k_z$, the pitch stiffness $k_\phi$ and the roll stiffness $k_\theta$,
the modal velocities $V_{mod}$ provided by module 10: the body heave modal velocity $\dot{z}G$, the body roll modal velocity $\dot{\theta}$, the body pitch modal velocity $\dot{\phi}$,
the modal moments of inertia provided by the estimator 20: the roll moment of inertia $I_\theta$ and the pitch moment of inertia $I_\phi$,
the sprung mass MSUS provided by the estimator 20,
an information unit IS for sportive mode, which can be in a Boolean state 0 for non-sportive mode, or in another Boolean state 1 for sportive mode, according to whether the vehicle driver has set a corresponding vehicle dashboard button to a sportive mode position or a non-sportive mode position, respectively.

For each of the modal gains $b_z$, $b_\theta$, $b_\phi$, the reference multiplier coefficient $b_{zREF}$, $b_{\theta REF}$, $b_{\phi REF}$, for heave, roll and pitch, respectively, is obtained by using a prerecorded reference table or curve that gives the reference multiplier coefficient as a function of the vehicle speed to retrieve the reference multiplier coefficient value $b_{zREF}$, $b_{\theta REF}$, $b_{\phi REF}$ that corresponds to the vehicle speed input value VVH, e.g., by linear interpolation.

For each of the modal gains $b_z$, $b_\theta$, $b_\phi$, the attenuation multiplier coefficient $b_{zATT}$, $b_{\theta ATT}$, $b_{\phi ATT}$ for heave, roll and pitch, respectively, is obtained.
by calculating a resistance $R_z$, $R_\theta$, $R_\phi$, for heave, roll and pitch, respectively, as a function of the body movement level NMC and the body bounce level NTC, using the formula:

$$R_z = NTC - \beta_z \cdot NMC$$

$$R_\theta = NTC - \beta_\theta \cdot NMC$$

$$R_\phi = NTC - \beta_\phi \cdot NMC$$

where $\beta_z$, $\beta_\theta$, $\beta_\phi$ are prerecorded parameters that make it possible to adjust the ratio between the two levels NMC and NTC, these parameters $\beta_z$, $\beta_\theta$, $\beta_\phi$ being set between 0.5 and 1, for example;
by using a prerecorded table or curve that gives the attenuation multiplier coefficient $b_{zATT}$, $b_{\theta ATT}$, $b_{\phi ATT}$ as a function of heave, roll and pitch resistance, respectively, to retrieve the attenuation multiplier coefficient value $b_{zATT}$, $b_{\theta ATT}$, $b_{\phi ATT}$ that corresponds to the calculated resistance value $R_z$, $R_\theta$, $R_\phi$ for heave, roll and pitch, respectively, e.g., by linear interpolation.

The attenuation multiplier coefficient $b_{zATT}$, $b_{\theta ATT}$, $b_{\phi ATT}$ for heave, roll and pitch is given, e.g., by the formula:

$$b_{zATT} = 1/(1 + a_z \cdot R_z)$$

$$b_{\theta ATT} = 1/(1 + a_\theta \cdot R_\theta)$$

$$b_{\phi ATT} = 1/(1 + a_\phi \cdot R_\phi)$$

where $a_z$, $a_\theta$, $a_\phi$ are prerecorded parameters.

The value obtained $b_{zATT}$, $b_{\theta ATT}$, $b_{\phi ATT}$ is retained only if the associated resistance $R_z$, $R_\theta$, $R_\phi$ is greater than a prescribed threshold, for example. If the associated resistance $R_z$, $R_\theta$, $R_\phi$ is less than or equal to this prescribed threshold, then 1 is used as the attenuation multiplier coefficient $b_{zATT}$, $b_{\theta ATT}$, $b_{\phi ATT}$.

For each of the modal gains $b_z$, $b_\theta$, $b_\phi$, the reset multiplier coefficient $b_{zREC}$, $b_{\theta REC}$, $b_{\phi REC}$, for heave, roll and pitch, respectively, is obtained with the formula $$b_{zREC} = \sqrt{\frac{k_z \cdot MSUS}{k_{zREF} \cdot MREF}}$$

$$b_{\theta REC} = \sqrt{\frac{k_\theta \cdot I_\theta}{k_{\theta REF} \cdot I_{\theta REF}}}$$

$$b_{\varphi REC} = \sqrt{\frac{k_\varphi \cdot I_\varphi}{k_{\varphi REF} \cdot I_{\varphi REF}}}$$

where $k_{zREF}$ is a constant, reference heave stiffness,
$k_{\theta REF}$ is a constant, reference roll stiffness,
$k_{\phi REF}$ is a constant, reference pitch stiffness,
$I_{\theta REF}$ is a constant, reference roll moment of inertia,
$k_{\phi REF}$ is a constant, reference pitch moment of inertia,
$k_{zREF}$, $k_{\theta REF}$, $k_{\phi REF}$, MREF, $I_{\theta REF}$, $I_{\phi REF}$ are prerecorded parameters, corresponding to a standardized load for the vehicle, e.g., four people weighing 67 kg in the vehicle passenger compartment, and 28 kg of luggage in the rear trunk.

For each of the modal gains $b_z$, $b_\theta$, $b_\phi$, the driving mode multiplier coefficient $b_{zTYP}$, $b_{\theta TYP}$, $b_{\phi TYP}$, for heave, roll and pitch, respectively, is equal to a prerecorded sportive mode gain $GS_z$, $GS_\theta$, $GS_\phi$, if the sportive mode information unit IS is in the sportive mode Boolean state 1, and is equal to 1 if the sportive mode information unit IS is in the non-sportive mode Boolean state 0.

The modal gains $b_z$, $b_\theta$, $b_\phi$ are calculated using the multiplier coefficients with the formulas:

$$b_z = b_{zREF} \cdot b_{zATT} \cdot b_{zREC} \cdot b_{zTYP}$$

$$b_\theta = b_{\theta REF} \cdot b_{\theta ATT} \cdot b_{\theta REC} \cdot b_{\theta TYP}$$

$$b_\phi = b_{\phi REF} \cdot b_{\phi ATT} \cdot b_{\phi REC} \cdot b_{\phi TYP}$$

The first heave modal force $F_{z1}$, the first roll modal force $F_{\theta 1}$, and the first pitch modal force $F_{\phi 1}$ are calculated, and are also called comfort or "Skyhook" modal forces. The first heave modal force $F_{z1}$, the first roll modal force $F_{\theta 1}$, and the first pitch modal force $F_{\phi 1}$ are provided at an output of the estimator 21.

Roadhook Logic

Below we describe the Roadhook-type logic, i.e., a logic that follows the road profile; this logic is also known as body attitude logic or handling logic.

The principle of this body attitude logic is to minimize or to make tend toward zero one or more of the modal body accelerations—heave, roll and pitch acceleration—with respect to the plane of the wheels.

In FIG. 10, the device has an estimator 31 for body modal velocities $V_{mod2}$ with respect to the mid-plane of the wheels as a function of the measured displacements DEB of the wheels A, B, C, D. These modal velocities $V_{mod2}$ with respect to the mid-plane of the wheels are called relative velocities, and they include the relative body heave velocity $\dot{z}_{G2}$, the relative body pitch velocity $\dot{\phi}_2$, and the relative body roll velocity $\dot{\theta}_2$.

This estimator 31 of relative modal velocities $V_{mod2}$ receives as input:
the displacements DEB measured on the wheels A, B, C, D.
the track width v,
at least two of the following parameters: the front-rear mass distribution value RMAvAr, the distance lg between the center of gravity G and the front wheel A, B axle, and the wheelbase e.

First the displacements DEB are filtered through a low-pass filter, e.g., a second-order Butterworth-type filter, to obtain only the low-frequency displacements and to substantially eliminate high-frequency bouncing.

Then a derivation circuit derives the displacements DEB thus filtered in order to obtain the wheel A, B, C, D Roadhook displacement velocities.

The relative modal velocities $V_{mod2}$ are then calculated using the following formulas:
relative body heave modal velocity with respect to the mid-plane of the wheels:

$$\dot{z}_{G2} = \frac{(e-lg)}{e}\frac{\dot{d}_A + \dot{d}_B}{2} + \frac{lg}{e}\frac{\dot{d}_C + \dot{d}_D}{2}$$

relative body pitch modal velocity with respect to the mid-plane of the wheels:

$$\dot{\varphi}_2 = \frac{\dot{d}_A - \dot{d}_B - \dot{d}_C + \dot{d}_D}{2e}$$

relative body roll modal velocity with respect to the mid-plane of the wheels:

$$\dot{\theta}_2 = \frac{\dot{d}_A - \dot{d}_B - \dot{d}_C + \dot{d}_D}{2v}$$

with
$\dot{d}_A$ = displacement speed VDEB for the left front wheel A,
$\dot{d}_B$ = displacement speed VDEB for the right front wheel B,
$\dot{d}_C$ = displacement speed VDEB for the right rear wheel C,
$\dot{d}_D$ = displacement speed VDEB for the left rear wheel D.

Anticipated Transverse Jerk

An estimator 32 is provided to calculate an anticipated transverse jerk $\dddot{Y}$ (third derivative of the Y-coordinate with respect to time) from the measured vehicle speed VVH and the rotation speed $\dot{\delta}$ of the vehicle steering wheel, where 6 is the measured angle of rotation of this steering wheel, as measured by any appropriate sensor or means.

This estimator 32 receives as input:
the sprung mass MSUS,
the front-rear mass distribution value RMAvAr,
the vehicle speed VVH,
the rotation speed $\dot{\delta}$ of the steering wheel.

Anticipated transverse jerk $\dddot{Y}$ is estimated using the formula:

$$\dddot{Y} = \frac{D \cdot \dot{\delta} \cdot VVH^2}{e(1 + K \cdot VVH^2)}$$

where D is the gear reduction of the steering wheel and K is an oversteer gain constant, calculated from the front-rear mass distribution value RMAvAr and the sprung mass MSUS. The oversteer gain K is a vehicle value, determined from measurements performed on the vehicle.

Anticipated Engine Torque to the Wheels

An estimator 40 is provided for calculating this anticipated engine torque to the wheels, designated as $C_R$.

In order to do this, the number i of the engaged gear $R_{EMBR}(i)$ of the vehicle gearbox is estimated, in a range from 1 to 5, for example.

The speed VVH1 the vehicle would be going at a prescribed engine rotation speed $\omega_{MOT1}$, which, in an engaged position, depends only on the gear $R_{EMBR}$ engaged, is calculated according to the formula $$VVH1 = VVH \cdot \Omega MOT1 / \Omega MOT$$

where $\Omega_{MOT}$ is the engine rotation speed at the vehicle speed VVH. For example, $\Omega_{MOT1} = 1000$ rpm.

For each gear ratio i, the following parameters are calculated:

$$P_i = 0.5 \cdot (VVH1(i) + VVH1(i+1))$$

By comparing VVH1 to $P_i$ and by retaining the value of $P_i$ closest to VVH1, the gear ratio I is obtained.

The anticipated engine torque $C_R$ to the wheels is then:

$$C_R = C_M \cdot R_{EMBR}(i),$$

with $R_{EMBR}(i) = \omega_{MOT}/\omega_{ROUE}$
where $R_{EMBR}(i)$ is the gear ratio having the number i,
$C_M$ is the engine torque, determined by any appropriate means, e.g. an engine control computer.
$\omega_{ROUE}$ is the wheel rotation speed.

Anticipated Longitudinal Jerk

An estimator 33 is provided for calculating an anticipated longitudinal jerk $\dddot{X}$ (third derivative of the X-coordinate with respect to time) from the derivative of the anticipated engine torque and the derivative $\dot{P}_{MC}$ of the master cylinder pressure $P_{MC}$.

This estimator 33 receives as input:
the sprung mass MSUS,
the master cylinder pressure $P_{MC}$,
the anticipated engine torque to the wheels $C_R$.
The calculation is performed as follows.

First, a prerecorded curve or table that gives a braking force for the master cylinder as a function of the master cylinder pressure is used to retrieve the value EFR of this braking force that corresponds to the master cylinder pressure $P_{MC}$, e.g., by linear interpolation. Next, a low-pass filter is applied to this breaking force EFR, e.g. a first-order Butterworth-type filter, and the braking force EFR thus filtered is derived in a derivation circuit in order to obtain the derivative $\dot{E}_{FRF}$ of the filtered force EFR.

An anticipated engine force to the wheels EMR, equal to the anticipated engine torque to the wheels $C_R$ divided by a predetermined and prerecorded mean wheel radius Rmoy, is calculated. Next, a low-pass filter is applied to this anticipated engine force to the wheels EMR, e.g. a first-order Butterworth-type filter, and the anticipated engine force EMR thus filtered is derived in a derivation circuit in order to obtain the derivative $\dot{E}_{MRF}$ of the filtered force EMR.

The anticipated longitudinal jerk $\dddot{X}$ is then equal to the sum of the derivatives $\dot{E}_{FRF}$, $\dot{E}_{MRF}$, divided by the total mass MTOT:

$$\dddot{X} = \frac{\dot{E}_{FRF} + \dot{E}_{MRF}}{MTOT}$$

In this formula, the total mass MTOT includes the sprung mass MSUS, it can include the mass of the wheels, and can be limited between two thresholds.

These jerks $\dddot{Y}$ and $\dddot{X}$ are estimated and do not come from a derivation of accelerometers, which are too noisy and too late.

Anticipatory Modal Force Terms

A module 34 is provided for calculating anticipatory modal force terms, namely:
an anticipatory pitch modal torque, designated by $c_{\phi 2ant}$,
an anticipatory roll modal torque, designated by $c_{\theta 2ant}$.

No anticipatory heave modal force is calculated, given that only one corrective Roadhook modal force is used for heave, as will be described below.

In the embodiment shown in FIG. 11, the estimator 34 receives the following values as input:

the anticipated transverse jerk $\dddot{Y}$ provided by the estimator 32,
the anticipated longitudinal jerk $\dddot{X}$ provided by the estimator 33,
the vehicle speed VVH,
the modal stiffnesses provided by the estimator 24: the heave modal stiffness $k_z$, the pitch modal stiffness $k_\phi$ and the roll modal stiffness $k_\theta$,
the relative modal velocities $V_{mod2}$ with respect to the mid-plane of the wheels, provided by the module 31: relative body heave modal velocity $\dot{z}_{G2}$, relative body roll modal velocity $\dot{\theta}_2$, relative body pitch modal velocity $\dot{\phi}_2$,
the modal moments of inertia provided by the estimator 20: the roll moment of inertia $I_\theta$ and the pitch moment of inertia I,
the sprung mass MSUS provided by the estimator 20,
the sportive mode information unit IS.

As shown in FIG. 11, each of these anticipatory modal force terms for pitch $c_{\phi 2ant}$ and roll $c_{\theta 2ant}$ is calculated by respectively processing the anticipated longitudinal jerk $\dddot{X}$ and the anticipated transverse jerk $\dddot{Y}$ to obtain a processed anticipated longitudinal jerk $\dddot{X}_{TT}$, and a processed anticipated transverse jerk $\dddot{Y}_{TT}$, then multiplying by a longitudinal stress gain $G_{SX}$ to obtain the anticipatory pitch torque $c_{\phi 2ant}$ and by a transverse stress gain $G_{SY}$ to obtain the anticipatory roll torque $C_{\theta 2ant}$ using the formulas:

$$c_{\phi 2ant} = G_{SX} \dddot{X}_{TT}$$

$$c_{\theta 2ant} = G_{SY} \dddot{Y}_{TT}$$

The longitudinal stress gain $G_{SX}$ and the transverse stress gain $G_{SY}$ are predetermined adjustment parameters, determined by vehicle testing in order to obtain the proper body attitude responses to the driver's demand.

This formulation is described below for calculating the anticipatory pitch torque, designated by $c_{\phi 2ant}$, from the anticipated longitudinal jerk $\dddot{X}$:

the anticipated longitudinal jerk $\dddot{X}$ passes through a low-amplitude canceling filter 341 having a high positive activation threshold SHJL for longitudinal jerk, and a low negative activation threshold SBJL for longitudinal jerk, in order to substitute zero values for the anticipated longitudinal jerk values $\dddot{X}$ located between the high activation threshold for longitudinal jerk SHJL and the low activation threshold for longitudinal jerk SBJL over time;

the filtered anticipated longitudinal jerk $\dddot{X}$ from the filter 341 is put through a module 342 for maintaining maxima that can have a parameter-adaptive dwell time for maintaining maxima, in order to obtain a jerk that is filtered and kept at its maxima, designated by $\dddot{X}_{f\,max}$, the jerk $\dddot{X}_{f\,max}$ from module 342, filtered and maintained at its maxima, is put through a slope-limiting module 343 that limits the absolute value of the downslope of the jerk $\dddot{X}_{f\,max}$, filtered and maintained at its maxima, so as to obtain the processed anticipated longitudinal jerk $\dddot{X}_T$, which is then multiplied respectively by the longitudinal stress gain $G_{SX}$ to obtain the anticipatory pitch torque $c_{\phi 2ant}$.

The dwell time must be long enough so that the corrective Roadhook term (see supra) has time to become significant for a simple action (simple cornering, braking or accelerating) and short enough so as not to disturb Roadhook operation and not to require needless damping.

When the anticipated transverse jerk $\dddot{Y}$ is put into the canceling filter 341, which has its high positive activation threshold SHJT for transverse jerk and its low negative activation threshold SBJT for transverse jerk, and then into the module 342 for maintaining maxima, this produces a jerk that is filtered and maintained at its maxima, designated as $\dddot{Y}_{f\,max}$, which is sent to the slope-limiting module 343 that has the transverse stress gain $G_{SY}$, in order to produce as output the anticipatory roll modal torque $c_{\theta 2ant}$. The high thresholds SHJT and SHJL can be equal and opposite to the equal low thresholds SBJT and SBJL. These thresholds are parameter-adaptive and are a trade-off between limiting ill-timed actions and ignoring small demands. Preferably, each of the thresholds SHJT, SHJL, SBJT and SBJL is between 1 and 10 ms$^{-3}$.

The use of anticipatory terms makes it possible to improve response time in order to set the actuators in the right state before the body has had time to pick up speed. This results in a notable improvement in body attitude.

Corrective Modal Force Terms

The module 34 also calculates at least one second corrective modal force term $F_{2COR}$ as a function of relative modal velocity $V_{mod2} = \dot{z}_{G2}, \dot{\phi}_2, \dot{\theta}_2$ with respect to the mid-plane of the wheels, using the general formula $$F_{2COR} = -b_{mod2} \cdot V_{mod2}$$

namely:
a second corrective heave modal force, designated as $F_{z2cor}$,
a second corrective pitch modal torque, designated as $C_{\phi2cor}$,
a second corrective roll modal torque, designated as $c_{\theta2cor}$, using the formulas:

$$F_{z2cor} = -b_{z2} \cdot \dot{z}_{G2}$$

$$c_{\phi2cor} = -b_{\phi2} \cdot \dot{\phi}_2$$

$$F_{\theta2cor} = -b_{\theta2} \cdot \dot{\theta}_2$$

where $b_{mod2}$ is a second corrective modal gain,
$b_{z2}$ is a second corrective heave modal gain for calculating the second corrective heave modal force $F_{z2cor}$,
$b_{\theta2}$ is a second corrective roll modal gain for calculating the second corrective roll modal torque $c_{\theta2cor}$,
$b_{\phi2}$ is a second corrective pitch modal gain for calculating the second corrective pitch modal torque $c_{\phi2cor}$.

The second corrective modal gains $b_{z2}, b_{\theta2}, b_{\phi2}$ can include one or more multiplier coefficients, e.g., with the following multiplier coefficients:
a second reference multiplier coefficient $b_{zREF2}, b_{\theta REF2}, b_{\phi REF2}$, for heave, roll and pitch, respectively,
a second reset multiplier coefficient $b_{zREC2}, b_{\theta REC2}, b_{\phi REC2}$, for heave, roll and pitch, respectively,
a second driving mode multiplier coefficient $b_{zTYP2}, b_{\theta TYP2}, b_{\phi TYP2}$, for heave, roll and pitch, respectively.

For each of the second modal gains $b_{z2}, b_{\theta2}, b_{\phi2}$, the second reference multiplier coefficient $b_{zREF2}, b_{\theta REF2}, b_{\phi REF2}$, for heave, roll and pitch, respectively, is obtained by using a second prerecorded reference curve or table for Roadhook logic that gives the second reference multiplier coefficient as a function of the vehicle speed to retrieve the second reference multiplier coefficient value $b_{zREF2}, b_{\theta REF2}, b_{\phi REF2}$ that corresponds to the vehicle speed VVH input value, e.g., by linear interpolation.

For each of the second modal gains $b_{z2}, b_{\theta2}, b_{\phi2}$, the second reset multiplier coefficient $b_{zREC2}, b_{\theta REC2}, b_{\phi REC2}$ is, for example, equal to the first reset multiplier coefficient $b_{zREC}, b_{\theta REC}, b_{\phi REC}$ for heave, roll and pitch, respectively, described above: $b_{zREC2} = b_{zREC}, b_{\theta REC2} = b_{\theta REC}, b_{\phi REC2} = b_{\phi REC}$.

For each of the second modal gains $b_z, b_\theta, b_\phi$, the second driving mode multiplier coefficient $b_{zTYP2}, b_{\theta TYP2}, b_{\phi TYP2}$, for heave, roll and pitch, respectively, is, for example, equal to the first driving mode multiplier coefficient $b_{zTYP}, b_{\theta TYP}, b_{\phi TYP}$, described above:

$$b_{zTYP2} = b_{zTYP}, b_{\theta TYP2} = b_{\theta TYP}, b_{\phi TYP2} = b_{\phi TYP}.$$

The second corrective modal gains $b_{z2}, b_{\theta2}, b_{\phi2}$ are calculated from the second multiplier coefficients, using the formulas:

$$b_{z2} = b_{zREF2} \cdot b_{zREC2} \cdot b_{zTYP2}$$

$$b_{\theta2} = b_{\theta REF2} \cdot b_{\theta REC2} \cdot b_{\theta TYP2}$$

$$b_{\phi2} = b_{\phi REF2} \cdot b_{\phi REC2} \cdot b_{\phi TYP2}$$

Roadhook Modal Forces

Next, the estimator 34 brings together
the anticipatory pitch modal torque $c_{\phi2ant}$ and the second corrective pitch modal torque $c_{\phi2cor}$ to obtain as output the second pitch force or torque $c_{\phi2}$,
the anticipatory roll modal torque $c_{\theta2ant}$ and the second corrective roll modal torque $c_{\theta2cor}$ to obtain as output the second roll torque or force $c_{\theta2}$.

The second corrective heave modal force, designated as $F_{z2cor}$ is taken as the output for the second heave modal force $F_{z2} = F_{z2cor}$.

These second forces $c_{\phi2}, c_{\theta2}$ and $F_{z2}$ are called handling or road-holding or "Roadhook" modal forces.

The output is obtained by choosing the anticipatory term or the corrective term, depending on their values, as shown in the table below.

| Corrective | Anticipatory Term | |
|---|---|---|
| Term | Small | Large |
| Small | Case 1: Corrective Term | Case 3: Anticipatory Term |
| Large | Case 2: Corrective Term | Case 4: The larger of the 2, if same sign Corrective term if opposite signs |

To obtain the second pitch modal force $c_{\phi2}$, the latter is equal to
the second corrective pitch modal torque $c_{\phi2cor}$, when the absolute value of the anticipatory pitch torque $c_{\phi2ant}$ is less than or equal to a first prescribed pitch value $V1\phi$, (case 1 and 2 in the table, corresponding to the small anticipatory term),
the anticipatory pitch modal torque $c_{\phi2ant}$, when the absolute value of the anticipatory pitch torque $c_{\phi2ant}$ is greater than the first prescribed pitch value $V1\phi$, and when the absolute value of the corrective pitch torque $c_{\phi2cor}$ is less than or equal to a second prescribed pitch value $V2\phi$ (case 3 in the table, corresponding to the small corrective term and the large anticipatory term).

If the absolute value of the anticipatory pitch torque $c_{\phi2ant}$ is greater than the first prescribed pitch value $V1\phi$ and if the absolute value of the corrective pitch modal torque $c_{\phi2cor}$ is greater than the second prescribed pitch value $V2\phi$ (case 4 in the table, corresponding to the large corrective term and the large anticipatory term), then
if the corrective pitch modal torque $c_{\phi2cor}$ and the anticipatory pitch torque $c_{\phi2ant}$ have the same sign, the second pitch modal force $c_{\phi2}$ is equal to $\max(|c_{\phi2cor}|, |c_{\phi2ant}|) \cdot \text{sgn}(c_{\phi2ant})$,
where sgn designates the sign function and max designates the maximum function, and
if the corrective pitch modal torque $c_{\phi2cor}$ and the anticipatory pitch torque $c_{\phi2ant}$ do not have the same sign, the second pitch modal force $c_{\phi2}$ is equal to the corrective pitch torque $c_{\phi2cor}$.

Obtaining the second roll force $c_{\theta2}$ is comparable to the above procedure, using $c_{\theta2cor}$ and $c_{\theta2ant}$ instead of $c_{\phi2cor}$ and $c_{\phi2ant}$, with a first prescribed roll value $V1\theta$ instead of $V1\phi$, and a second prescribed roll value $V2\theta$ instead of $V2\phi$.

Combining Skyhook and Roadhook

The first heave modal force $F_{z1}$, the first roll modal force $F_{\theta1}$ and the first pitch modal force $F_{\phi1}$ provided by the estimator 21 (comfort modal forces in Skyhook logic, generally designated as first modal setpoint forces F1), as well as the second heave modal force $F_{z2}$, the second roll modal force $c_{\theta2}$ and the second pitch modal force $c_{\varphi 2}$ provided by the estimator 34 (handling modal forces in Roadhook logic, generally designated as second modal setpoint forces F2), are sent to a setpoint force estimator 22 for each damper, thus for the wheels A, B, C, D, the setpoint forces FA1, FB1, FC1, FD1.

For each mode, the estimator 22 weights the first comfort force F1 and the second handling force F2 in order to calculate the modal setpoint force F.

The estimator 22 calculates:
  a heave modal force $F=F_z$ setpoint as a function of the first heave force $F_{z1}$ for comfort, the second heave force $F_{z2}$ for handling and a weighting coefficient $\alpha$, using the formula:

$$F_z = \alpha \cdot F_{z2} + (1-\alpha) \cdot F_{z1}$$

a pitch modal force $F=F_\varphi$ setpoint as a function of the first pitch force $F_{\varphi 1}$ for comfort, the second pitch force $c_{\varphi 2}$ for handling and the weighting coefficient $\alpha$, using the formula:

$$F_\varphi = \alpha \cdot c_{\varphi 2} + (1-\alpha) \cdot F_{\varphi 1}$$

a roll modal force $F=F_\theta$ setpoint as a function the first roll force $F_{\theta 1}$ for comfort, the second roll force $c_{\theta 2}$ for handling and the weighting coefficient $\alpha$, using the formula:

$$F_\theta = \alpha \cdot c_{\theta 2} + (1-\alpha) \cdot F_{\theta 1}$$

The calculation of this weighting coefficient $\alpha$ from detected demands is described below.

The weighting coefficient is normally 0, to cause the first modal force setpoints to follow the first comfort forces $F_{z1}$, $F_{\theta 1}$ and $F_{\varphi 1}$ of Skyhook logic.

Corrected Longitudinal Acceleration

The corrected longitudinal acceleration $\ddot{X}_{COR}$ is calculated by an estimator 25 from the measured longitudinal acceleration ACCL, provided by the longitudinal accelerometer CAPL.

The estimator 25 receives as input:
  the measured vehicle speed VVH,
  the sprung mass MSUS provided by the estimator 20,
  the measured longitudinal acceleration ACCL,
  the brake master cylinder pressure $P_{MC}$, provided by the sensor CAP-P,
  the anticipated engine torque to the wheels $C_R$, provided by the estimator 40.

The calculation is performed as follows.

First the prerecorded table or curve that gives the braking force for the master cylinder as a function of the master cylinder pressure is used to retrieve the value EFR of this breaking force that corresponds to the master cylinder pressure $P_{MC}$, e.g., using linear interpolation.

The anticipated engine force to the wheels EMR, which is equal to the anticipated engine torque to the wheels $C_R$ divided by a predetermined and prerecorded mean wheel radius Rmoy, is calculated.

A longitudinal drag force ETR is calculated as a function of the vehicle speed VVH using the formula:

$$ETR = COEF \cdot (VVH)^2 + DEC$$

where COEF is a predetermined, prerecorded coefficient and DEC is a predetermined, prerecorded offset.

The total longitudinal force ELT is equal to the sum of the braking force EFR, the anticipated engine force EMR to the wheels and the longitudinal drag force ETR:

$$ELT = EFR + EMR + ETR$$

The total mass MTOT, which includes the sprung mass MSUS, can include the mass of the wheels, and can be limited between two thresholds, is calculated.

The anticipated longitudinal acceleration $\ddot{X}_{ANT}$ is calculated by dividing the total longitudinal force ELT by the total mass MTOT:

$$\ddot{X}_{ANT} = ELT/MTOT$$

The anticipated longitudinal acceleration $\ddot{X}_{ANT}$ is then optionally limited between two thresholds.

The corrected longitudinal acceleration $\ddot{X}_{COR}$ is then calculated by
  calculating a change EVAL in longitudinal acceleration, equal to the anticipated longitudinal acceleration $\ddot{X}_{ANT}$ minus the measured longitudinal acceleration ACCL:

$$EVAL = \ddot{X}_{ANT} - ACCL$$

applying a high-pass filter PH, e.g., a first-order Butterworth-type filter, to this change EVAL in longitudinal acceleration to obtain the filtered longitudinal change EVAL, equal to $PH(\ddot{X}_{ANT} - ACCL)$,
  adding the filtered longitudinal change EVAL to the measured longitudinal acceleration ACCL to obtain the corrected longitudinal acceleration $\ddot{X}_{COR}$:

$$\ddot{X}_{COR} = ACCL + PH(\ddot{X}_{ANT} - ACCL)$$

The cutoff frequency of the high pass filter PH makes it possible to adjust the measurement estimation reset speed.

Corrected Transverse Acceleration

The corrected transverse acceleration $\ddot{Y}_{COR}$ is calculated by an estimator 26 from the measured transverse acceleration ACCT, provided by the transverse accelerometer CAP-ACCT.

The estimator 26 receives as input:
  the sprung mass MSUS,
  the front-rear mass distribution value RMAvAr,
  the vehicle speed VVH,
  the angle of rotation $\delta$ of the steering wheel,
  the measured transverse acceleration ACCT.

The anticipated transverse acceleration $\ddot{Y}_{ANT}$ is estimated using the formula:

$$\ddot{Y}_{ANT} = \frac{D \cdot \delta \cdot VVH^2}{e(1 + K \cdot VVH^2)}$$

where D is the gear reduction of the steering wheel and K is the oversteer gain constant, calculated as a function of the front-rear mass distribution value RMAvAr and the sprung mass MSUS. The oversteer gain constant K is a vehicle value, determined from measurements on the vehicle.

The anticipated longitudinal acceleration $\ddot{Y}_{ANT}$ is then optionally limited between two thresholds.

The corrected longitudinal acceleration $\ddot{Y}_{COR}$ is then calculated by
  calculating a change EVAT in transverse acceleration, equal to the anticipated transverse acceleration $\ddot{Y}_{ANT}$ minus the measured transverse acceleration ACCT:

$$EVAT = \ddot{Y}_{ANT} - ACCT$$

applying a high-pass filter PH2, e.g., a first-order Butterworth-type filter, to this change EVAT in transverse acceleration to obtain the filtered transverse change EVAL, equal to PH $\ddot{Y}_{ANT} - ACCT$),
  adding the filtered transverse change EVAT to the measured transverse acceleration ACCT in order to obtain the corrected transverse acceleration $\ddot{Y}_{COR}$:

$$\ddot{Y}_{COR} = ACCT + PH2(\ddot{Y}_{ANT} - ACCT)$$

The cutoff frequency of the high-pass filter PH2 makes it possible to adjust the measurement estimation reset speed.

Demand Detection and Weighting Coefficient for Skyhook and Roadhook Forces

In FIG. 12, an estimator 23 calculates the weighting coefficient α for the first comfort forces and the second handling forces.

the estimator 23 receives as input:

the anticipated longitudinal jerk $\dddot{X}$, provided by the estimator 33, the anticipated transverse jerk $\dddot{Y}$, provided by the estimator 32, the corrected longitudinal acceleration $\ddot{X}_{COR}$, provided by the estimator 25, the corrected transverse acceleration $\ddot{Y}_{COR}$, provided by the estimator 26, the sportive mode information unit IS.

By default, the first Skyhook logic comfort forces $F_{z1}$, $F_{\theta1}$ and $F_{\phi1}$ are selected for the modal setpoint forces, meaning that the weighting coefficient α is 0. The demands are detected from the values taken by these inputs. As soon as a demand is detected, the weighting coefficient α changes to "all handling" or Roadhook—meaning to 1—in order to select the second handling forces $F_{z2}$, $c_{\theta2}$ and $c_{\phi2}$ as modal setpoint forces. If a stabilization is detected during a demand, typically a wide highway curve as in FIG. 14, it is possible to make the weighting coefficient α change progressively to 0 in Skyhook logic so as to give priority to comfort. If a variation in accelerometer values is detected during this stabilization, the apportionment changes immediately back to "all handling", i.e., 1.

A Boolean signal "lateral driver demand" (SSOLT) is created and a Boolean signal "longitudinal driver demand" (SSOLL) when parameter-based thresholds for corrected acceleration or anticipated jerk are crossed.

The weighting coefficient changes to 1 and the dwell time is reinitialized when the following events are detected:
rising edge for longitudinal driver demand,
rising edge for lateral driver demand,
longitudinal jerk crossing the threshold upon longitudinal driver demand,
longitudinal acceleration variation crossing the threshold upon longitudinal driver demand,
transverse jerk crossing the threshold upon transverse driver demand,
transverse acceleration variation crossing the threshold upon transverse driver demand.

The estimator 23 determines a longitudinal threshold modulation MODL and a transverse threshold modulation MODT as a function of the sportive mode information unit IS.

If the sportive mode information unit IS is equal to 1, the longitudinal threshold modulation MODL is equal to a prescribed longitudinal value less than 1 and the transverse threshold modulation MODT is equal to a prescribed transverse value less than 1.

If the sportive mode information unit IS is equal to 0, the longitudinal threshold modulation MODL is equal to 1 and the transverse threshold modulation MOD1 is equal to 1.

Next, demand detection signals are determined: a longitudinal demand logic signal SSOLL, a second longitudinal logic signal SL2, a third longitudinal logic signal SL3, a transverse demand logic signal SSOLT, a fourth transverse logic signal ST4 and a fifth transverse logic signal ST5, as follows:

if $|\ddot{X}_{COR}| > THAL_1 \cdot MODL$ or $|\dddot{X}| > THJL_1 \cdot MODL$ then SSOLL=1,
otherwise SSOLL=0.

if $SSOLL=1$ and $|\dddot{X}| > THJL_2$ then SL2=1,
otherwise SL2=0.
the longitudinal acceleration $\gamma_L$ is initialized at 0.

if $|\ddot{X}_{COR} - \gamma_L| > THAL_2 \cdot |\gamma_L|$ then
$\gamma_L = \ddot{X}_{COR}$ is recorded for the next calculation of SL3,
if SSOLL=1 then SL3=1 and otherwise SL3=0, if $|\ddot{X}_{COR} - \gamma_L| \leq THAL_2 \cdot |\gamma_L|$ then $SL3=0$.

if $|\ddot{Y}_{COR}| > THAT_1 \cdot MODT$ or $|\dddot{Y}| > THJT_1 \cdot MODT$ then SSOLT=1,
otherwise SSOLT=0.

if $SSOLT=1$ and $|\dddot{Y}| > THJT_2$ then ST4=1,
otherwise ST4=0.
the transverse acceleration $\gamma_T$ is initialized at 0.

if $|\ddot{Y}_{COR} - \gamma_T| > THAT_2 \cdot |\gamma_T|$ then
$\gamma_T = \ddot{Y}_{COR}$ is recorded for the next calculation of ST5,
if SSOLT=1 then ST5=1 and otherwise ST5=0, if $|\ddot{Y}_{COR} - \gamma_T| < THAT_2 \cdot |\gamma_T|$ then $ST5=0$.

$THAL_1$ is a first longitudinal acceleration threshold,
$THAL_2$ is a second longitudinal acceleration change threshold,
$THJL_1$ and $THJL_2$ are first and second longitudinal jerk thresholds,
$THAT_1$ is a first transverse acceleration threshold,
$THAT_2$ is a second transverse acceleration change threshold,
$THJT_1$ and $THJT_2$ are first and second transverse jerk thresholds, these thresholds being prerecorded.

The states 1 of the detection signals correspond to states where a demand is present, and the states 0 correspond to states where there is no demand.

A logic signal SSOL for driver demand is determined to be equal to 1 if the first longitudinal demand logic signal SSOLL is 1 and/or if the transverse demand logic signal SSOLT is 1 (non-exclusive logical operator OR).

A first logic signal SL1 is made equal to the driver demand logic signal SSOL.

Based on the sportive mode information unit IS, a modulation time TMOD between the first Skyhook forces and the second Roadhook forces is determined:
if IS=1 then the modulation time TMOD is equal to $TMOD = TPER \cdot MODSPORT,$ otherwise TMOD=TPER,
where TPER is a predetermined, prerecorded permanent operating time that represents the changeover time from Roadhook logic to Skyhook logic during steady-state operation, and MODSPORT is a modulation time multiplier factor for sport mode that is greater than 1 and is predetermined and prerecorded.

In FIG. 13, which shows timing diagrams as a function of time t, an intermediate weighting coefficient $\alpha_{INTER}$ is next calculated as follows:

- initialization at 0 (stage S10)
- intermediate weighting coefficient $\alpha_{INTER}$ set at 1 on each rising edge detected for any or all of the first, second, third, fourth and fifth logic signals SL1=SSOL, SL2, SL3, ST4, ST5 (stage S11),
- intermediate weighting coefficient $\alpha_{INTER}$ kept at 1 for a predetermined, prerecorded dead time TMORT after each of these detected rising edges (stage S12),
- intermediate weighting coefficient $\alpha_{INTER}$ reduced to 0, e.g., linearly, during the modulation time TMOD after this dead time TMORT (stage S13),
- if a new rising edge is detected, the intermediate weighting coefficient $\alpha_{INTER}$ is reset to 1 following stage S11, and the process S11, S12, S13 described above is started again.

A limited logic signal $SSOL_{LIMIT}$ for driver demand is calculated by filtering the driver demand logic signal SSOL through a negative pitch limiter so that it changes from 1 to 0 minimum in the modulation time TMOD.

The weighting coefficient $\alpha$ is equal to the intermediate weighting coefficient $\alpha_{INTER}$ multiplied by the limited logic signal $SSOL_{LIMIT}$ for driver demand:

$$\alpha = \alpha_{INTER} \cdot SSOL_{LIMIT}$$

FIG. 14 shows the timing diagrams of the steering wheel angle $\delta$ during simple cornering, which causes the weighting coefficient $\alpha$ to change to 1 (Roadhook) at the beginning and at the end of the turn, while the weighting coefficient $\alpha$ is 0 (Skyhook) before the turn, after the turn and in the middle of the turn.

Setpoint Forces to the Wheels

The prerecorded table or curve that gives the distribution coefficient for force to the front as a function of the front-rear mass distribution value is used to retrieve the value of the front force distribution coefficient CAV that corresponds to the front-rear mass distribution value RMAvAr, e.g., by a linear interpolation. This front force distribution coefficient CAV is greater than or equal to 0 and less than or equal to 1.

An anti-roll ratio RAD greater than or equal to 0 and less than or equal to 1 is calculated as a function of the vehicle speed VVH. For example, the prerecorded table or curve that gives the anti-roll ratio as a function of the vehicle speed is used to retrieve the anti-roll ratio value RAD that corresponds to the vehicle speed VVH, e.g., by linear interpolation.

The estimator 22 calculates the setpoint forces for the dampers AM on the wheels A, B, C, D from the modal setpoint forces $F_z$, $F_\theta$ and $F_\varphi$, using the following formulas:

the setpoint force FA1 for the left front wheel A:

$$FA1 = \frac{F_z \cdot CAV}{2} - \frac{F_\varphi}{2 \cdot e} - \frac{F_\theta \cdot RAD}{v}$$

the setpoint force FB1 for the right front wheel B:

$$FB1 = \frac{F_z \cdot CAV}{2} - \frac{F_\varphi}{2 \cdot e} + \frac{F_\theta \cdot RAD}{v}$$

the setpoint force FC1 for the right rear wheel C:

$$FC1 = \frac{F_z \cdot (1-CAV)}{2} + \frac{F_\varphi}{2 \cdot e} + \frac{F_\theta \cdot (1-RAD)}{v}$$

the setpoint force FD1 for the left rear wheel D:

$$FD1 = \frac{F_z \cdot (1-CAV)}{2} + \frac{F_\varphi}{2 \cdot e} - \frac{F_\theta \cdot (1-RAD)}{v}$$

From the setpoint forces FA1, FB1, FC1, FD1 for the dampers on the wheels A, B, C, D and from the displacement velocities VDEB valid for these wheels A, B, C, D, respectively, the estimator then determines the damping setpoint law $ER_C = ER_{CA}$, $ER_{CB}$, $ER_{CC}$, $ER_{CD}$ that must be used by the damper AM for the wheel A, B, C, D, e.g., by positioning the point (VDEB(A); FA1) on the chart in FIG. 15 and looking for the closest damping law ER.

Minimum States

An estimator 27 calculates minimum damping states. This function makes it possible to keep the suspension out of damping states that are too soft by imposing minimum states $ER_M$, i.e., minimum damping laws $ER_M$, as a function of four different input streams:

- the vehicle speed, in order to obtain the first minimum state $ER_{M1}$: this criteria is used for scenarios in which the vehicle is at a stop or a very low speed (e.g., going down sidewalks), or at a very high speed, for safety and body stability.
- the corrected longitudinal acceleration, in order to obtain the second minimum state $ER_{M2}$: this criteria is used for safety during very high longitudinal demand in cases where Roadhook logic would not be adequate, and for stabilized acceleration or braking situations, as opposed to transitory longitudinal phases.
- the corrected transverse acceleration, in order to obtain the third minimum state $ER_{M3}$: this criteria is used for safety during very high lateral demand in cases where Roadhook logic would not be adequate, and for stabilized cornering situations, during which the integration logic gives priority to Skyhook logic.
- the anticipated transverse jerk, in order to obtain the fourth minimum state $ER_{M4}$: this criteria works in parallel with Roadhook logic using anticipatory terms. It ensures minimal tilting by controlling the actuator by anticipation, and depending on parameterization, also makes it possible to use minimal states typed as oversteer or understeer in order to play on the vehicle responsiveness when cornering.

These minimum states can be calculated separately for each wheel, for example.

The first minimum state $ER_{M1}$ is obtained by using the prerecorded table or curve that gives the second minimum state as a function of the vehicle speed to retrieve the value of the first minimum state $ER_{M1}$ that corresponds to the measured vehicle speed VVH, e.g., by linear interpolation. The first minimum state can be calculated separately for the front and rear wheels.

The second minimum state $ER_{M2}$ is obtained by using the prerecorded table or curve that gives the second minimum state as a function of the vehicle speed and the corrected longitudinal acceleration to retrieve the value of the second minimum state $ER_{M2}$ that corresponds to the measured vehicle speed VVH and the corrected longitudinal acceleration $\ddot{X}_{COR}$, e.g., by linear interpolation.

The third minimum state $ER_{M3}$ is obtained by using the prerecorded table or curve that gives the third minimum state as a function of the vehicle speed and the corrected transverse acceleration to retrieve the value of the third minimum state $ER_{M3}$ that corresponds to the measured vehicle speed VVH and the corrected transverse acceleration $\ddot{Y}_{COR}$, e.g., by linear interpolation.

The fourth minimum state $ER_{M4}$ is obtained by using the prerecorded table or curve that gives the fourth minimum state as a function of the anticipated transverse jerk to retrieve the value of the fourth minimum state $ER_{M4}$ that corresponds to the anticipated transverse jerk $\dddot{Y}$, e.g., by linear interpolation.

For each wheel, the overall minimum damping state $ER_M$ provided by the estimator 27 is then equal to the maximum of the minimum states $ER_{M1}$, $ER_{M2}$, $ER_{M3}$, $ER_{M4}$. In this way an overall minimum damping state $ER_{MA}$, $ER_{MB}$, $ER_{MC}$, $ER_{MD}$ is obtained for the wheels A, B, C, D, respectively.

Each of the two functions, Roadhook and Skyhook, has the information from the four displacement sensors as the main input stream.

For example, for a vehicle traveling at less than 20 km/h without driver demand, the Skyhook function will order the softest damping possible, as the absolute modal velocities will be very low. However, in this scenario, the vehicle is likely to go up and down sidewalks, which are high-stress demands for which the vehicle would preferably be in a little bit stiffer damping state.

Likewise, for a very high vehicle speed (e.g., on the highway), with no driver demands and on a good road, Skyhook will order soft damping. This can pose a problem for high speeds, because damping may have to become very stiff very suddenly, which is not possible with the actuators being used.

Moreover, Roadhook logic can lag slightly behind driver demands: the anticipatory forces estimated by Roadhook logic are not late, but in order to change over to a stiff law, the wheel must already have increased its displacement speed. But when the wheel is increasing its displacement speed, it is already too late. Therefore, an adequately stiff damping level must be ensured independently of the wheel displacement speed, by incorporating minimum damping states during longitudinal and lateral accelerations, as well as during lateral jerk (ahead of accelerations).

In order to improve vehicle comfort, it is preferable to change back to Skyhook logic in stabilized cornering or stabilized longitudinal acceleration scenarios. This makes it possible to temper absolute body velocities. However, one must take care in these scenarios not to under-damp the vehicle too much, because these situations are potentially dangerous (a curve that gets tighter, a road surface that deteriorates on a curve, etc.). Minimum states will therefore be applied during stabilized accelerations so that the Skyhook function can be used safely.

Lastly, minimum states during jerk make it possible to incorporate flexibility in responsiveness and driving pleasure when cornering.

Damping Law Control

A control module 28 receives as input the damping setpoint law $ER_{CA}$, $ER_{CB}$, $ER_{CC}$, $ER_{CD}$, provided by the estimator 22 and the overall minimum damping state $ER_{MA}$, $ER_{MB}$, $ER_{MC}$, $ER_{MD}$, provided by the estimator 27, for the wheels A, B, C, D, respectively, and from these states it calculates the damping control states $ER_A$, $ER_B$, $ER_C$, $ER_D$ for the wheels A, B, C, D by taking the maximum of the damping setpoint law and the overall minimum damping state for each wheel:

$$ER_A = \max(ER_{CA}, ER_{MA})$$

$$ER_B = \max(ER_{CB}, ER_{MB})$$

$$ER_C = \max(ER_{CC}, ER_{MC})$$

$$ER_D = \max(ER_{CD}, ER_{MD})$$

These control states $ER_A$, $ER_B$, $ER_C$, $ER_D$ determine the damping law applied by each damper AM and are the control magnitudes ER sent on the control input COM to the actuator for each damper AM for each wheel A, B, C, D.

The control states $ER_A$, $ER_B$, $ER_C$, $ER_D$ are additionally sent to the estimator 12 input for the actual state ER of the actuator.

Additional functions are described below, which can be provided in the device for calculating the damper control states $ER_A$, $ER_B$, $ER_C$, $ER_D$ of the dampers for the wheels A, B, C, D.

Addressing Impacts

Impacts are detected on the front wheels. It is not possible to anticipate the obstacle. Thus, an obstacle will be detected when the front wheels encounter it. An impact is detected by monitoring the displacement speed of the front wheels of the vehicle.

The distinguishing feature of an impact is the major displacement speed it generates at the wheels. The obstacle may be low in amplitude (e.g., a shallow pothole), but it generates an impact because the wheels are displaced very quickly.

In FIG. 16, an estimator 50 is provided to calculate a setpoint state or damping setpoint law ERP in case an impact is detected. This estimator 50 receives as input:
the front wheel A, B displacements DEB(A), DEB(B), provided by the displacement sensors CAP-DEB,
the front wheel A, B displacement speed VDEB(A), VDEB(B),
the measured vehicle speed VVH,
the corrected transverse acceleration $\ddot{Y}_{COR}$,
the weighting coefficient $\alpha$ for the first comfort forces $F_{z1}$, $F_{\theta1}$ and $F_{\phi1}$ and the second handling forces $F_{z2}$, $c_{\theta2}$ and $c_{\phi2}$.

Impact detection and processing is done independently on the left and right wheels of the vehicle. If an impact is detected only on the right front wheel, then impact processing will be activated only on the right-side wheels. If an impact is detected only on the front left wheel, then impact processing will be activated only on the left-side wheels.

The estimator 50 comprises:
a module 51 to detect impacts based on displacements DEB and displacement speeds VDEB,
a module 52 for calculating an activation lag time and a signal to disable processing as a function of the vehicle speed VVH, the corrected transverse acceleration $\ddot{Y}_{COR}$ and the weighting coefficient $\alpha$.
a module 53 for processing impacts on the left side,
a module 54 for processing impacts on the right side.

Impact Detection

An impact detection threshold SDP is predefined in module 51. When the front wheel displacement speed VDEB(A) on one side of the vehicle, e.g., the left side in what follows, is greater in absolute value than the impact detection threshold SDP, a Boolean logic signal P for probable impact detection is set at 1, whereas if the front wheel displacement speed VDEB(A) is less than or equal in absolute value to the impact detection threshold SDP, the probable impact detection signal P is at 0.

In order to optimize the adjustment, this impact detection threshold SDP is parameterized according to the vehicle speed VVH. A prerecorded table, curve or map that gives the impact detection threshold as a function of the vehicle speed is used to retrieve the value of the impact detection threshold SDP that corresponds to the vehicle speed VVH, e.g., by linear interpolation. For example, at very high speeds VVH, almost any obstacle may generate a high displacement speed. At high vehicle speeds, the impact detection threshold SDP must therefore be increased so as to not implement ill-timed control processing of road stresses that do not correspond to actual impacts.

After an impact, displacement speeds can oscillate for a few moments, and may go over the threshold SDP multiple times due to a single initial impact. A dwell time TEMP that is activated the first time the threshold SDP is exceeded then makes it possible to avoid detecting multiple impacts for a single encounter with an obstacle.

For example, when an impact is detected, it is only validated if it is detected for longer than a prescribed impact detection time DDP, e.g., 15 milliseconds.

Disabling Impact Detection

An impact detection disabling signal S=SIDP is generated as being equal to 1 in order to disable impact detection when at least one of the front displacements DEB(A), DEB(B) becomes less than a first stop threshold SDEB1 or greater than a second stop threshold SDEB2, and is otherwise equal to 0.

Actually, during forceful body movements, displacement can be such that the train will abut its stops. Slamming into the stops generates a high displacement speed that is capable of activating the impact processing function. If this function is activated in this scenario, it will prescribe soft damping states at the rear for a certain time. The problem is that if the damping state changes to soft while the train is abutting its stops, then the body movements will not be curbed at all, and excessive heaving of the rear axle will occur. Therefore, impact detection will be disabled in this scenario. To do this, the wheel displacement values are monitored. When these displacements exceed the parameter-adaptive threshold SDEB1 or SDEB2 (which corresponds to the possible displacement path of the wheel prior to contact with the compression or extension stops), impact detection is disabled.

The module 51 generates an impact validation signal W from the probable impact detection signal P as follows.

A validatable impact signal Q and the impact validation signal W are generated during the calculation cycle n as a function of their values during the preceding cycle n−1 and an elapsed dwell-time TEMP signal T, calculated from the probable impact detection signal P.

The validatable impact signal Q is initialized at 1.

An elapsed dwell time TEMP signal T is set at 1 if the probable impact detection signal P remained at 0 since its last falling edge for a time greater than the dwell time TEMP. Otherwise the elapsed dwell time TEMP signal T is 0.

The validatable impact signal Q is equal to:

$$Q' = \overline{Q} \cdot \overline{W} \cdot T + Q \cdot \overline{W} \cdot T + Q \cdot \overline{W} \cdot \overline{T} + Q \cdot W \cdot T$$

where Q' designates the state in the following cycle, and ¯ indicates the complement.

The impact validation signal W is then set at 1, meaning that an impact has indeed been detected, when simultaneously the probable impact detection signal P is at 1 for a prescribed number of consecutive cycles, e.g. 3 cycles making up the time period DDP, the validatable impact signal Q is 1, the impact detection disable signal S=SIDP is 0, indicating no disabling, the corrected transverse acceleration $\ddot{Y}_{COR}$ is less in absolute value than a prescribed disable threshold SY for the corrected transverse acceleration: $|\ddot{Y}_{COR}| < SY$, thus $$W = P \cdot Q \cdot \overline{S} \cdot (|\ddot{Y}_{COR}| < SY)$$

Impact Encounter Time Lag and Disabling for Low Speeds

In order to help the rear wheels take the impact, it is imperative that they encounter the obstacle in a soft damping state. To do this, the impact processing function must calculate the precise instant of the encounter by the rear wheels.

When the impact is detected on the front wheels, i.e., when the impact validation signal W is set at 1, the module 52 calculates the time lag DEL for the encounter by the rear wheels with respect to the front wheels, generally as follows:

$$DEL = (e/VVH) - TR$$

where TR is a prescribed reaction time corresponding to the time needed for the actuators to change to a soft state.

If the vehicle speed VVH is too low (less than or equal to a vehicle speed threshold SVVH) or if the weighting coefficient α for the first comfort forces $F_{z1}$, $F_{\theta 1}$ and $F_{\phi 1}$ and the second handling forces $F_{z2}$, $c_{\theta 2}$ and $c_{\phi 2}$ is too large (greater than or equal to a weighting coefficient threshold SCOEFF), a disabling signal SINV for low speeds is set at 1, and the rear-wheel time lag DEL is equal to a maximum prescribed value DELMAX.

Control Processes for the Rear Wheels

As soon as the impact is detected on the left front wheel, a dwell time is activated during the rear-wheel time lag DEL in the processing module 53 for the left wheels. At the end of this dwell time, a prescribed soft damping setpoint state ESP is applied to the left rear wheel of the vehicle for a prescribed application time, so that the impact is appropriately damped by the left rear wheel damper. The damping state selected and the duration of application are parameter-adaptive control data.

Control Processes for the Front Wheels

As soon as the impact is detected on the left front wheel, control processing for the left front wheel can only be post-processing. The purpose of the latter is to reduce shaking in the train and to curb wheel movement and rebound just after the obstacle.

Post-processing for the front wheels consists in applying a prescribed stiff damping setpoint state ERP for a prescribed application time. The damping state selected and the duration of application are parameter-adaptive control data.

Post-Processing for the Front and Rear Wheels

At the end of the rear wheel control process, impact post-processing is implemented on the front wheels and the rear wheels. In order to reduce wheel movement due to the obstacle, a prescribed stiff damping setpoint state ERP is applied to the rear wheels for a prescribed post-processing time. The damping state selected and the duration of the front and rear wheel post-processing are parameter-adaptive control data.

Disabling the Control Process

The impact processing modules 53, 54 produce imposed impact damping states ERP that can take precedence over the damping states ER ordered by the Skyhook and Roadhook functions.

In certain scenarios, these imposed impact damping states ERP can either downgrade the comfort of the vehicle or pose a safety hazard. This is why impact processing is subject to being disabled, if need be.

When the vehicle is traveling over a very deteriorated road with high frequency stresses (paved road stresses), wheel displacement speeds will reach high levels that can activate the impact processing function.

If this function is activated, it will apply impact damping setpoint states ERP that will be stiff for a set time on all four wheels. On a paved road, these stiff damping states ERP will cause discomfort during the entire post-processing time. The ideal strategy for not generating body movement on paved roads is actually to remain in the softest possible damping law.

Thus, impact processing will be disabled as soon as a set number of impacts, e.g., three, are detected in a short, set time period, e.g., up to the impact validation signal W. The resulting disablement will have a parameter-adaptive duration.

Another possible case for disabling the control process is vehicle speeds VVH that are too low. Moreover, when the AMVAR integration logic is in "handling" mode, i.e., when Roadhook logic is activated and the weighting coefficient α is equal to 1 or close to 1, impact processing is also disabled (see supra SINV).

Another instance of disabling the control process can be provided for the safety of the vehicle. During high driver demand or when the vehicle is settled into stabilized cornering, applying a soft damping state can be hazardous for road-holding. In these driving conditions, Roadhook logic optimizing vehicle handling absolutely must not be deactivated by other functions. This is a matter of individual safety. Thus, the lateral acceleration of the vehicle is monitored, for one: when it crosses a certain parameter-adaptive threshold, impact processing is disabled as described above when the corrected transverse acceleration $\ddot{Y}_{COR}$ has an absolute value greater than or equal to the prescribed disable threshold SY for corrected transverse acceleration: $|\ddot{Y}_{COR}| \geq SY$.

The module 52 generates an impact processing disable signal INHIB, equal to 1, in order to disable impact processing by the modules 53 and 54 when either or both of the following conditions are met:
- a preset number of impacts, represented by rising edges of the impact validation signal W, is detected in a preset time period;
- the disable signal SINV for low speeds is set at 1, to indicate that the vehicle speed VVH is too low or that the weighting coefficient α for the first comfort forces $F_{z1}$, $F_{\theta1}$ and $F_{\phi1}$ and the second handling forces $F_{z2}$, $c_{\theta2}$ and $c_{\phi2}$ is too large, indicating that Roadhook logic is operative, $$|\ddot{Y}_{COR}| \geq SY.$$

The rear-wheel time lag DEL and the impact processing disable signal INHIB are sent to two inputs for each of the processing modules 53, 54. Each of the modules 53, 54 also has a clock input CLK linked by a logic operator AND with the impact validation signal W input W(A) for the left front wheel A and the impact validation signal W input W(B) for the right front wheel B, respectively, to indicate the calculation frequency of the modules 53 and 54. A clock input is also provided for each of the blocks, estimators and modules shown in the figures.

Should the estimator 50 be provided, the latter provides setpoint states ERP in the event of impact detection to another input of the control module 28, that is, the setpoint states $ERP_A$, $ERP_B$, $ERP_C$, $ERP_D$ for the wheels A, B, C, D.

From these states, the control module 28 calculates the damping control states $ER_A$, $ER_B$, $ER_C$, $ER_D$ for the wheels A, B, C, D by taking the maximum of the damping control states $ER_C$, ERP and the overall minimum damping state for each wheel:

$$ER_A = \max(ER_{CA}, ER_{PA}, ER_{MA})$$

$$ER_B = \max(ER_{CB}, ER_{PB}, ER_{MB})$$

$$ER_C = \max(ER_{CC}, ER_{PC}, ER_{MC})$$

$$ER_D = \max(ER_{CD}, ER_{PD}, ER_{MD})$$

Addressing Large-Amplitude Movements (Logic for Large Displacements)

Detection of large displacements and high displacement speeds is provided for the front wheels or the rear wheels. The goal is to detect the obstacles that can generate large amplitudes in body movement as early as possible in forward and/or reverse drive. Detection is provided for these scenarios in order to handle obstacles that exert stress simultaneously on the right and left wheels of the front or rear train. These obstacles can be detected as compression for speed bumps or as extension for catch drains or sizable dips. In forward drive, this kind of obstacle will generate large-amplitude displacements and displacement speeds on the front wheels.

In FIG. 17, an estimator 60 is provided to calculate a setpoint state or damping setpoint law ERGD in the event that a large-amplitude wheel movement is detected. This estimator 60 receives as input:
- the front displacements DEB(A), DEB(B) of the front wheels A, B and the displacements DEB(C), DEB(D) of the back wheels C, D, which can be those filtered DEBF(A), DEBF(B), DEBF(C), DEBF(D) by the filter 13, for example, using the displacements DEB(A), DEB(B), DEB(C), DEB(D) provided by the displacement sensors CAP-DEB,
- the front displacement speeds VDEB(A), VDEB(B) of the front wheels A, B and the displacement speeds DEB(C), DEB(D) of the rear wheels C, D, provided by the derivation module DER,
- the measured vehicle speed VVH,
- the body bounce level NTC provided by the estimator 24.

The estimator 60 implements a logic for detecting and processing large-amplitude movements, and includes:
- a detection module 61 for large-amplitude wheel movements,
- a module 62 for enabling and disabling the detection of large-amplitude wheel movements,
- a module 63 for calculating a processing coefficient χ for large-amplitude wheel movements,
- a module 64 for calculating the setpoint state or damping setpoint law ERGD for large-amplitude wheel movements.

Detecting Large-Amplitude Wheel Movements

A first detection threshold SDGD for large displacements and a second detection threshold SVGD for high displacement speeds are predefined in the module 61.

When the left front wheel displacement DEBF(A) crosses the first detection threshold SDGD for large displacements, the right front wheel displacement DEBF(B) crosses the first detection threshold SDGD for large displacements, the left front wheel displacement speed VDEB(A) crosses the second detection threshold SVGD for high displacement speeds, and the right front wheel displacement speed VDEB(B) crosses the second detection threshold SVGD for high displacement speeds all together, then a first detection signal SDGAV for large front movements is set at 1 to indicate that a large-amplitude movement has been detected on the front wheels.

The same applies for a second detection signal SDGAR for large rear movements, which is set at 1 to indicate that a large-amplitude wheel movement has been detected on the rear wheels, when the four threshold-crossing conditions are fulfilled by the displacements DEBF(D) and DEBF(C) and the displacement speeds VDEB(D) and VDEB(C) for the rear wheels.

The first and second thresholds SDGD and SVGD can be different for the front and the rear. The first and/or second threshold crossings SDGD, SVGD can be the displacement and/or the displacement speed crossing below the lower threshold SDGD, SVGD, e.g., on the damper extension stroke, and/or the displacement and/or the displacement speed crossing above another threshold SDGD greater than the lower threshold SDGD, SVGD, e.g., on the damper compression stroke.

A detection signal SGD for large movements is set at 1 to indicate that a large-amplitude wheel movement has been detected on the wheels when the first detection signal SDG-DAV for large movements in front and/or the second detection signal SDGDAR for large movements at the rear registers 1. The large-movement detection signal SDG is sent by the detection module 61 to the enable and disable module 62.

For greater precision and to avoid ill-timed control processing, the first large-displacement detection threshold SDGD and the second large displacement speed detection threshold SVGD are parameterized according to the vehicle speed VVH. For example, for each of these thresholds SDGD, SVGD, the prerecorded table, curve or map that gives the detection threshold as a function of the vehicle speed is used to retrieve the value of the detection threshold SDGD, SVGD that corresponds to the vehicle speed VVH, e.g., by linear interpolation.

Disabling the Detection of Large Wheel Movements

An enable or disable signal INSGD for detecting large-amplitude wheel movements is generated by the module 62 as being equal to 0 in order to disable detection when one or more of the following conditions is met:

the weighting coefficient $\alpha$ for the first comfort forces $F_{z1}$, $F_{\theta 1}$ and $F_{\phi 1}$ and the second handling forces $F_{z2}$, $c_{\theta 2}$ and $c_{\phi 2}$ is too large (greater than a weighting coefficient threshold SCOEFF2, e.g., zero), indicating that Roadhook logic is at least partially operative, the bounce level NTC is greater than a prescribed bounce level threshold SNTC.

If none of the disablement conditions is met and if the large-movement detection signal SGD is 1 to indicate that a large-amplitude wheel movement has been detected, then the signal INSGD adopts the value 1, enabling the detection of large-amplitude wheel movements.

In the first case of disablement (weighting coefficient $\alpha$), at the driver's demand, it is safer to let Roadhook logic act and react in response to road stresses in order to improve body attitude and particularly in order to maximize wheel contact with the road. If Roadhook logic wants to transmit an instruction to change to soft damping states, it must not be kept from doing so. This is why the detection and processing of large-amplitude movements is disabled when Roadhook logic is active.

In the second case of disablement (bounce level NTC), processing large-amplitude movements can be detrimental to vibrational comfort, because a damping state that is too firm will transfer road irregularities to the body, and thus will not filter bounces and jolts generated by this road. This is why it is preferable to disable the processing logic for large-amplitude movements when the road is deteriorated. A state-of-the-road recognition logic is used, based on bandpass filtering of displacements DEB. As indicated above for calculating the level NMC of low frequencies and the level NTC of bouncing, filtering around the body mode (around 1 Hz) and in the bounce band (between 3 and 8 Hz) is used to characterize the state of the road (good road, road with a good surface that generates body movements, road with a deteriorated but flat surface, road with a deteriorated surface that generates body movements). For disablement, the bounce level calculated from filtering between 3 and 8 Hz is used. The prescribed threshold SNTC for the bounce level is parameter-adaptive. In this way, the trade-off between body attitude and vibrational comfort is optimized.

Control Processing for Large Wheel Movements

From the enable or disable signal INSGD for large-amplitude wheel movement detection, the estimator 63 calculates the processing coefficient $\chi$ for large-amplitude wheel movement.

The processing coefficient $\chi$ is a variable greater than or equal to 0 and less than or equal to 1. The processing coefficient $\chi$ is 0 by default. When the signal INSGD changes from the state 0 in which large-amplitude wheel movement detection is disabled to the state 1 in which large-amplitude wheel movement detection is enabled, the processing coefficient $\chi$ increases from 0 to 1 with a prescribed upward slope, e.g., that can be parameterized by a first dwell time TEMP1 at the input of module 63. The processing coefficient $\chi$ is then kept at its maximum value 1 for a prescribed time, e.g., that can be parameterized by a second dwell time TEMP2 at the input of module 63, and goes back down to 0 with a prescribed downslope, e.g., that can be parameterized by a third dwell time TEMP at the input of module 63.

Minimum States in Cases where Large Wheel Movements are Detected

The module 64 receives the processing coefficient $\chi$ for large-amplitude wheel movement and the vehicle speed VVH, and from them it calculates the damping setpoint law ERGD in the event that a large amplitude wheel movement is detected.

Large-amplitude wheel movement situations are processed by using minimum damping setpoint states ERGD.

The various parameters involved in calculating the processing coefficient $\chi$ make it possible to control the exact instant and the exact length of time during which the minimum damping states ERGD will be applied by the module 64.

These minimum states ERGD can be parameterized according to the vehicle speed VVH in order to optimize the trade-off between body attitude and vibrational comfort, regardless of the vehicle speed: the minimum states to be used are less at 30 km/h for going over speed bumps than at a higher speed where a stress from the road that creates a large displacement will require high minimum states. The minimum states ERGD can also be calculated separately for the front wheels and the rear wheels.

The damping control states ERGD are calculated, for example, as follows:

an intermediate state ERGD-INTER of large-amplitude wheel movement (with an intermediate damping law number) is retrieved from a prerecorded table or curve that gives this intermediate state as a function of the vehicle speed, with the value ERGD-INTER of the intermediate state of large-amplitude wheel movement corresponding to the vehicle speed, e.g., by linear interpolation.

the large-amplitude wheel movement damping control state ERGD is then equal to the intermediate damping state ERGD-INTER multiplied by the large-amplitude wheel movement processing coefficient $\chi$, rounded to the nearest damping law number, for example.

Should the estimator 60 be provided, the latter supplies the damping control states ERGD in the event that a large-amplitude wheel movement is detected, i.e., for the wheels A, B, C, D, the control states $ERP_A$, $ERP_B$, $ERP_C$, $ERP_D$, to another input of the control module 28.

From these states, the control module 28 calculates the damper control states $ERGD_A$, $ERGD_B$, $ERGD_C$, $ERGD_D$ for the wheels A, B, C, D by taking the maximum of the damping control states $ER_C$, ERGD (and ERP, if need be, to take impacts into account) and the minimum overall damping state ERM:

$$ER_A = \max(ER_{CA}, ERGD_A, ER_{MA})$$

$$ER_B = \max(ER_{CB}, ERGD_B, ER_{MB})$$

$$ER_C = \max(ER_{CC}, ERGD_C, ER_{MC})$$

$$ER_D = \max(ER_{CD}, ERGD_D, ER_{MD})$$

The invention claimed is:

1. Suspension control device with variable damping for a motor vehicle body on its wheels, said device comprising:
    a computer adapted to calculate a control magnitude of an actuator of at least one damper with variable damping of a suspension of the vehicle as a function of at least one body modal speed, calculated from at least one body modal acceleration determined on the vehicle,
    at least one displacement sensor providing a displacement measurement which is a measurement of a displacement of a wheel of the vehicle with respect to the vehicle body,
    a first calculation means for calculating the body modal acceleration from the displacement measurement provided by the displacement sensor, wherein the first calculation means for calculating the body modal acceleration comprises:
        a suspension force estimator providing an estimation of at least one force exerted by a suspension of said wheel on the body as a function of at least the displacement measurement provided by the displacement sensor, and
        a second calculation means for calculating the body modal acceleration as a function of at least the suspension force provided by said suspension force estimator.

2. Control device according to claim 1, wherein the suspension force estimator comprises:
    a derivator module calculating a displacement speed from the displacement measurement provided by the displacement sensor,
    a damping force estimator providing an estimation of a damping force of the damper as a function of the displacement speed provided by the derivator module and a memorized current damping law of the damper,
    a dry friction force estimator providing an estimation of a dry friction force as a function of the displacement speed,
    a flexion force estimator providing an estimation of a flexion force of suspension springs and stops of the damper as a function of the displacement value and a determined static attitude of the body.

3. Control device according to claim 2, wherein the dry friction force estimator provides the estimation of the dry friction force as a hyperbolic tangential or circular tangent function of the displacement speed divided by a fixed value, this function being multiplied by a prescribed multiplying factor.

4. Control device according to claim 2, wherein the flexion force estimator comprises:
    a static attitude calculation module for calculating the static attitude of the vehicle as a function of the displacement value,
    an adder for calculating a summed value of the displacement value and the static attitude,
    an absolute flexion force calculation module for calculating an absolute flexion force of suspension springs and stops of the damper as a function of said summed value,
    a static flexion force calculation module for calculating a static flexion force on said wheel as a function of the static attitude,
    a subtractor providing said flexion force of suspension springs and stops by subtracting the static flexion force from the absolute flexion force of suspension springs and stops.

5. Suspension control device according to claim 4, wherein a displacement sensor is provided for each of the two front wheels and the two rear wheels, and the static attitude calculation module has a means for calculating the front static attitude and the rear static attitude of the vehicle, as being the mean displacement of the front wheel displacements and the rear wheel displacements, respectively, filtrated by a low-pass filter, a front attitude offset constant and a rear attitude offset constant, respectively, being added to this filtered mean displacement.

6. Control device according to claim 1, wherein the first calculation means further comprises a roll torque estimator providing an estimation of a roll torque and/or an estimator of a pitch torque.

7. Control device according to claim 6, wherein the first calculation means has:
    a means for calculating a transverse acceleration reset value RECT,
    a sensor of the vehicle body transverse acceleration ACCT;
    the roll torque estimator calculating said roll torque $c_\theta$ using the formula:

$$c_\theta = (ACCT - RECT) \cdot (MTOT) \cdot d(G, CR)$$

where MTOT is the vehicle mass, and
d(G, CR) is the predetermined distance between the center of gravity (G) of the body and its roll center (CR).

8. Control device according to claim 6, wherein the first calculation means has:
    a means for calculating a longitudinal acceleration reset value RECL,
    a sensor of the longitudinal acceleration ACCL of the vehicle body,
    the estimator of the pitch torque calculating said pitch torque $c_\phi$ using the formula:

$$c_\phi = (ACCL - RECL) \cdot (MTOT) \cdot hG + c_{\phi B},$$

where MTOT is the vehicle mass,
hG is the predetermined height between the center of gravity (G) of the body and its pitch center (CT), and
$c_{\phi B}$ is the component of the pitch torque attributable to the Brouilhet effect.

9. Control device according to claim 8, wherein the component $c_{\phi B}$ of the pitch torque attributable to the Brouilhet effect is calculated as a function of a braking information unit provided by a determination module as a function of a master cylinder pressure value provided by a master cylinder pressure sensor.

10. Control device according to claim 1, which comprises a body modal acceleration filter that eliminates at least the low frequencies of the body modal acceleration provided by the first calculation means and a third means for calculating the body modal velocity from the filtered body modal acceleration provided by the first filter.

11. Control device according to claim 10, wherein the low cutoff frequency of the body modal acceleration filter is greater than or equal to 0.1 Hz.

12. Control device according to claim 1, wherein the first means for calculating the body modal acceleration comprises a displacement measurement filter that eliminates at least the low frequencies from the displacement measurement provided by the displacement sensor.

13. Control device according to claim 12, wherein the low cutoff frequency of the displacement measurement filter is greater than or equal to 0.2 Hz.

14. Control device according to claim 1, wherein the control magnitude is a damping law determined from a plurality of different damping laws that impose the damper force as a function of its displacement speed.

15. Motor vehicle having a body, wheels, a suspension of the body on the wheels, and a suspension control device according to claim 1.

16. Production method for equipping a motor vehicle,
    the motor vehicle being equipped with wheels, a body, a
        suspension having at least one damper with variable damping of the body on the wheels,
    said method comprising:
    providing the suspension control device according to claim 1,
    mounting the computer on the vehicle, and
    programming the computer using at least one program having program instructions that employ the calculating means of the suspension control device according to claim 1.

17. Computer-readable medium carrying a computer program for controlling a computer, having program instructions for calculating a body modal acceleration from a displacement measurement provided by a wheel displacement sensor of a wheel of a vehicle body, for calculating a body modal velocity as a function of at least this body modal acceleration, and for calculating a control magnitude of an actuator of a damper of a suspension of the wheel as a function of this body modal speed, when it is employed in a suspension control device according to claim 1,
    wherein the computer program comprises:
        a suspension force estimator providing an estimation of at least one force exerted by a suspension of the wheel as a function of at least the displacement measurement provided by the displacement sensor, and
        a calculation means for calculating the body modal acceleration as a function of at least a suspension force provided by the suspension force estimator.

18. Computer-readable medium according to claim 17, wherein the suspension force estimator comprises:
    a derivator module calculating a displacement speed from the displacement measurement provided by the displacement sensor,
    a damping force estimator providing an estimation of a damping force of the damper as a function of the displacement speed provided by the derivator module and a memorized current damping law of the damper,
    a dry friction force estimator providing an estimation of a dry friction force as a function of the displacement speed,
    a flexion force estimator providing an estimation of a flexion force of suspension springs and stops of the damper as a function of the displacement value and a determined static attitude of the body.

* * * * *